United States Patent Office 3,446,255
Patented May 27, 1969

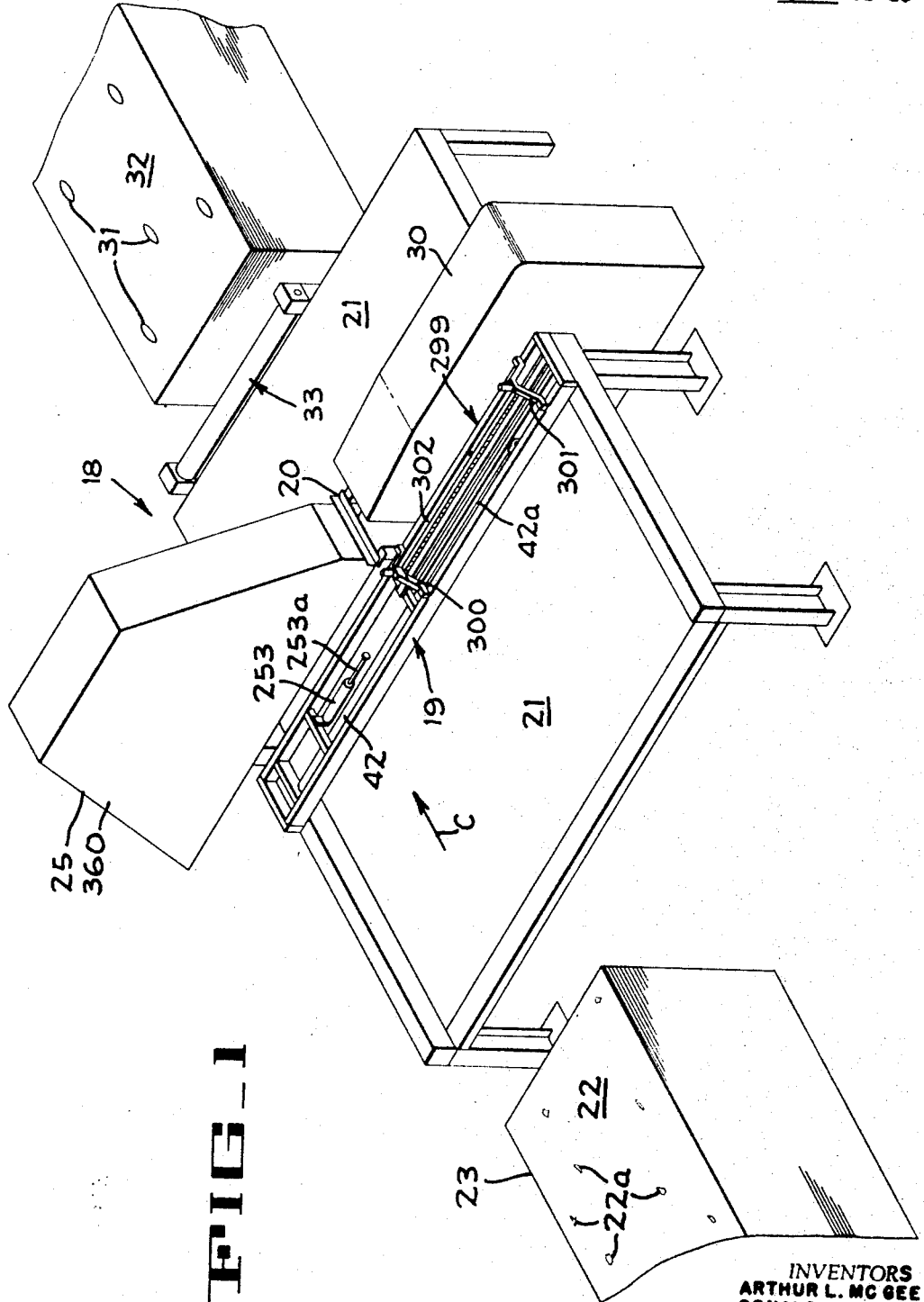

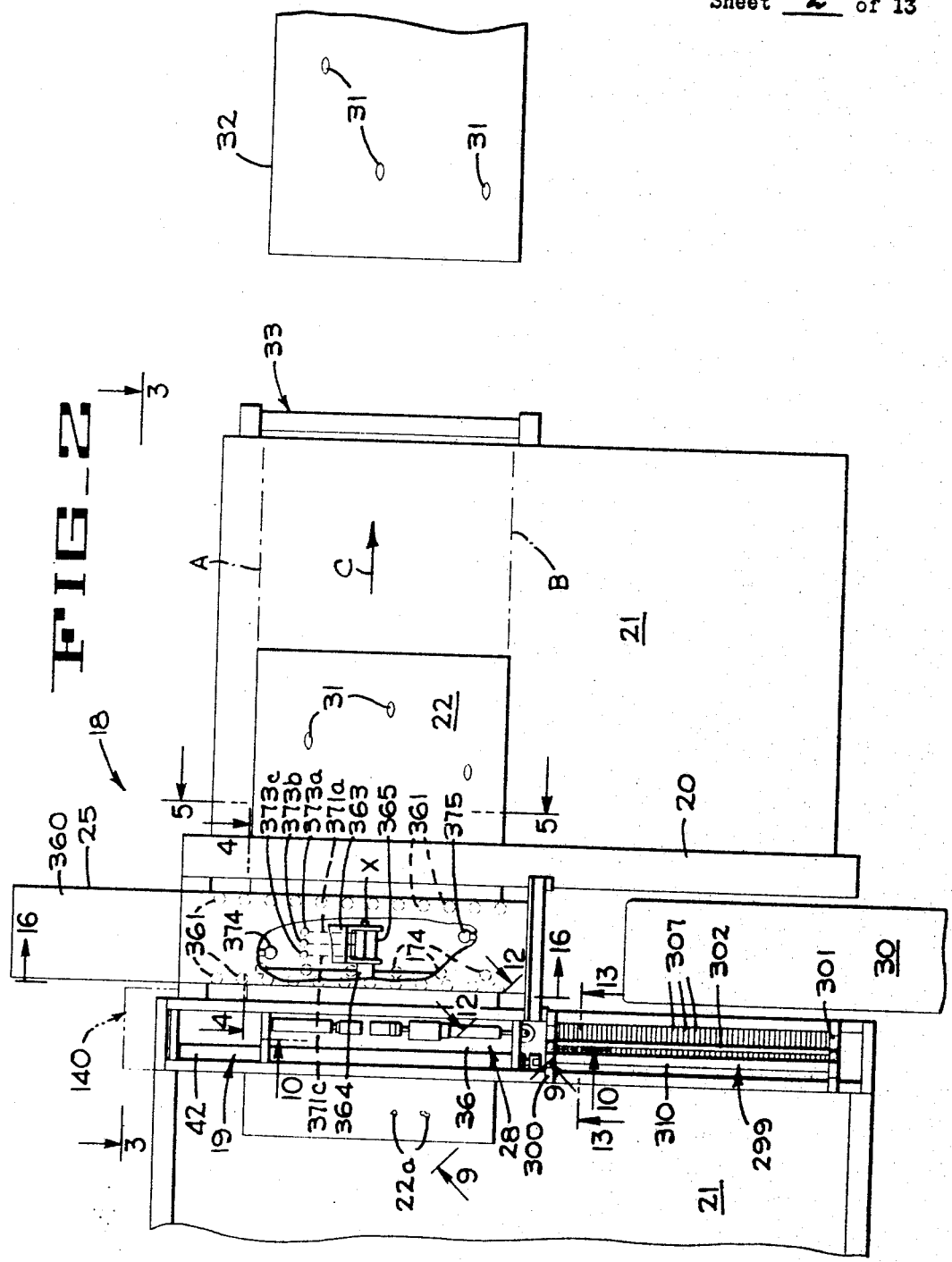

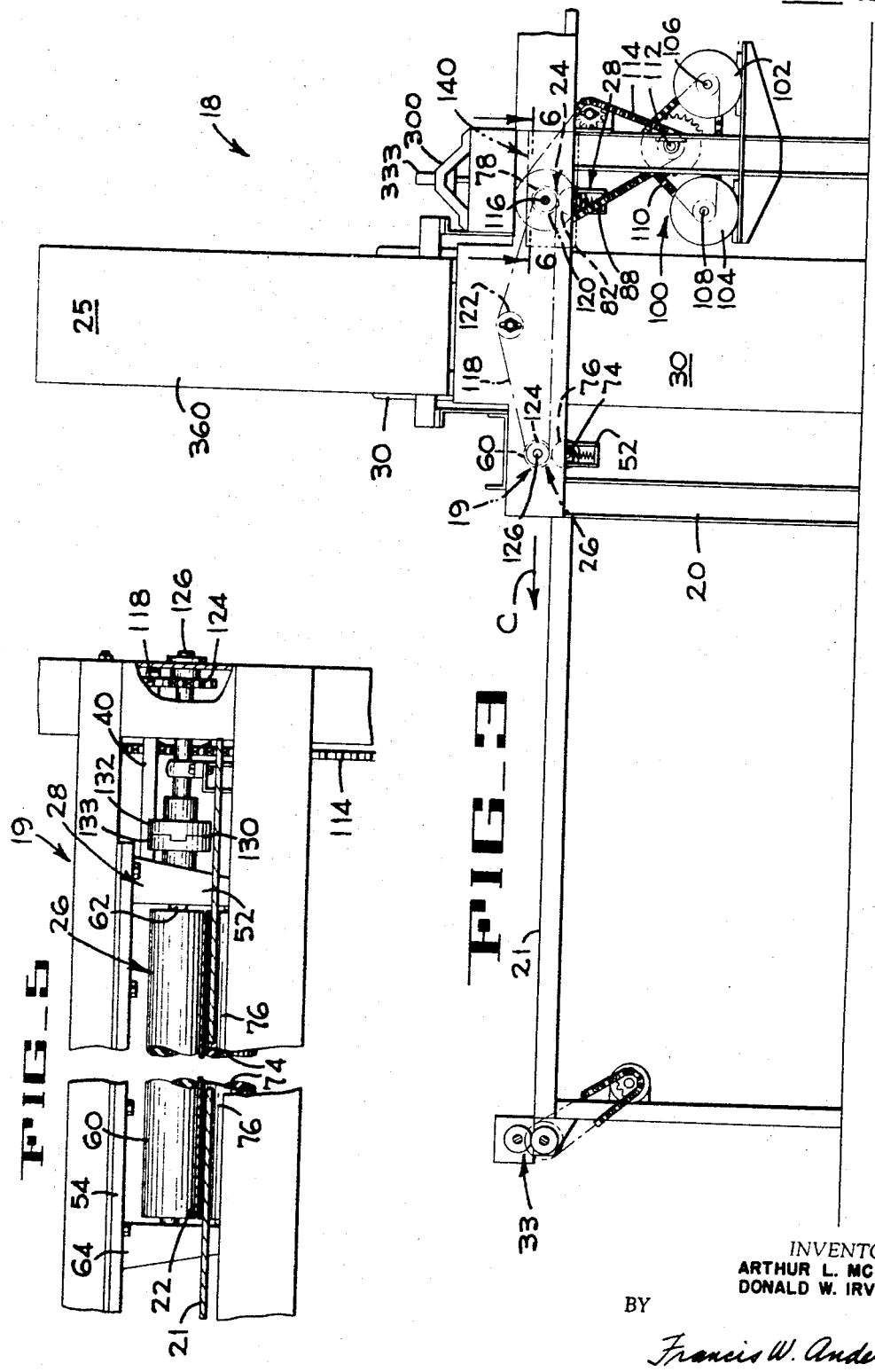

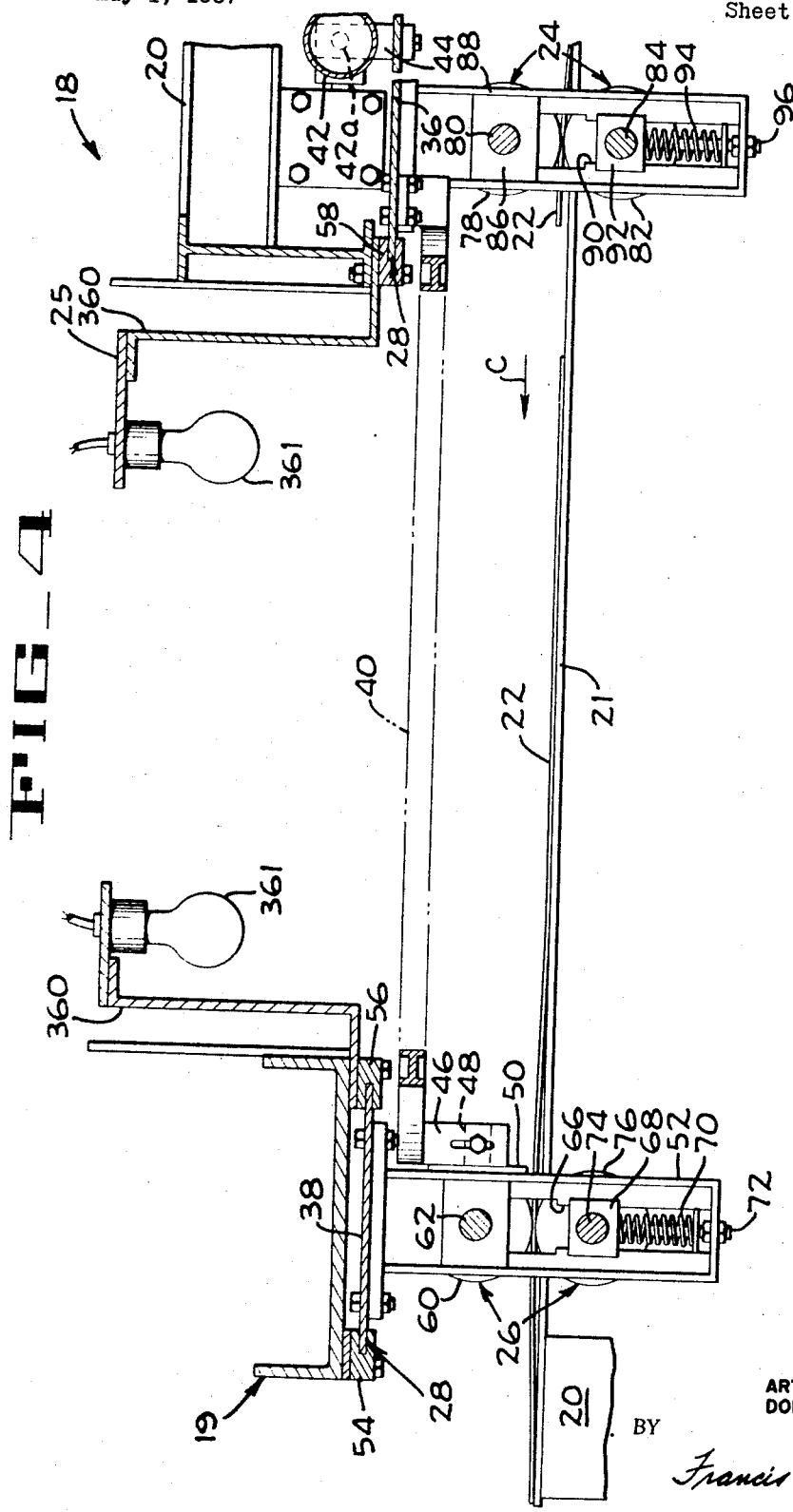

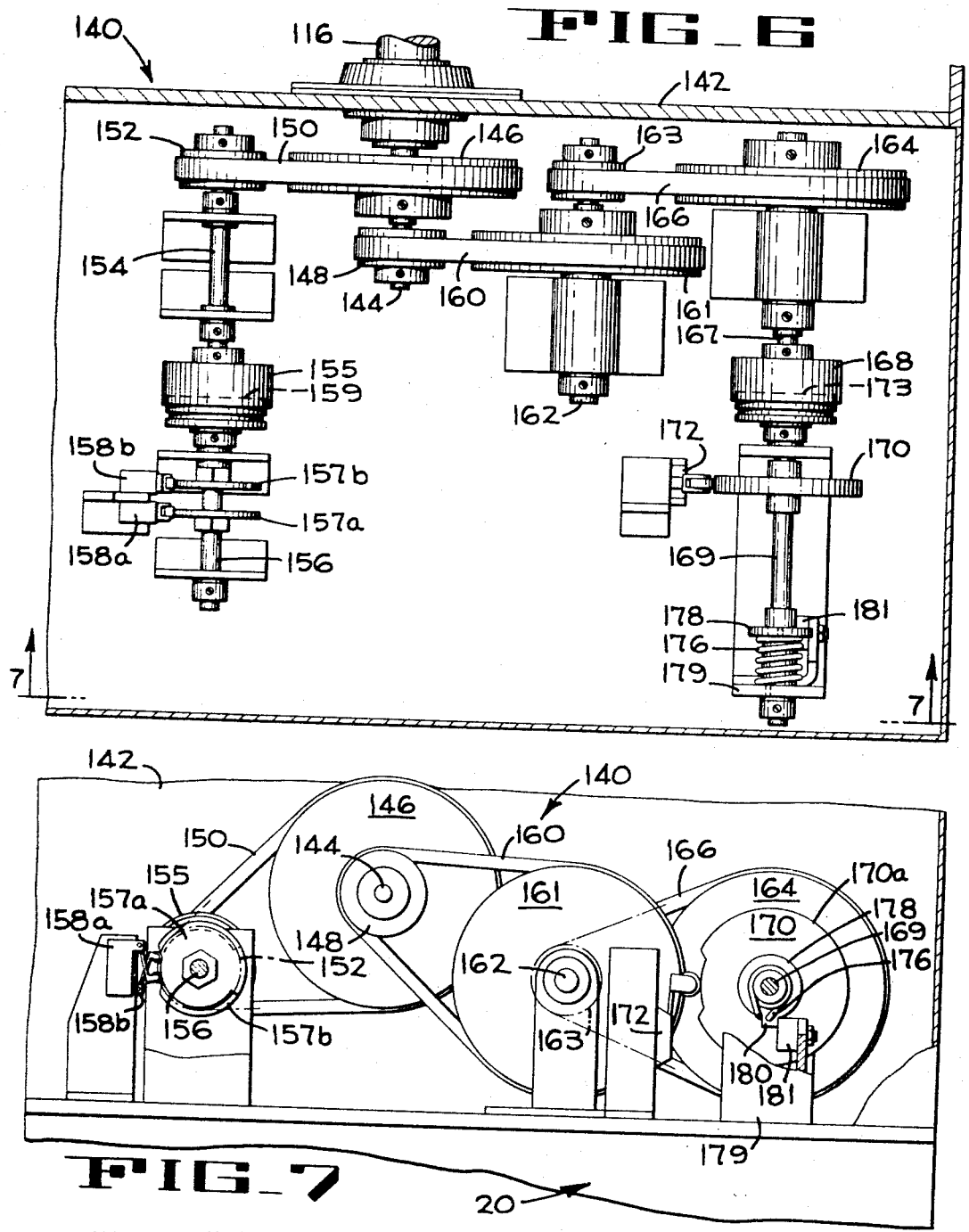

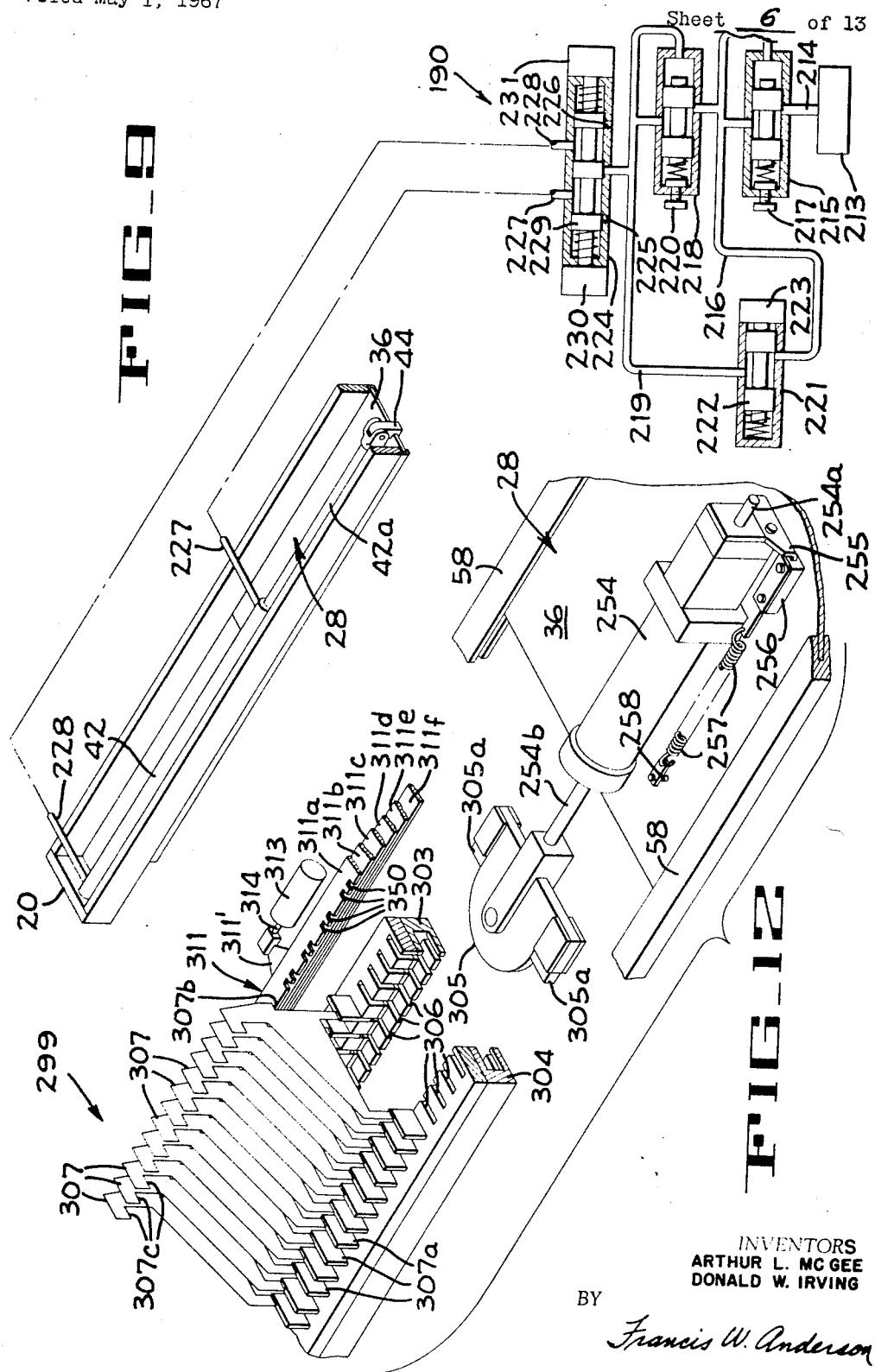

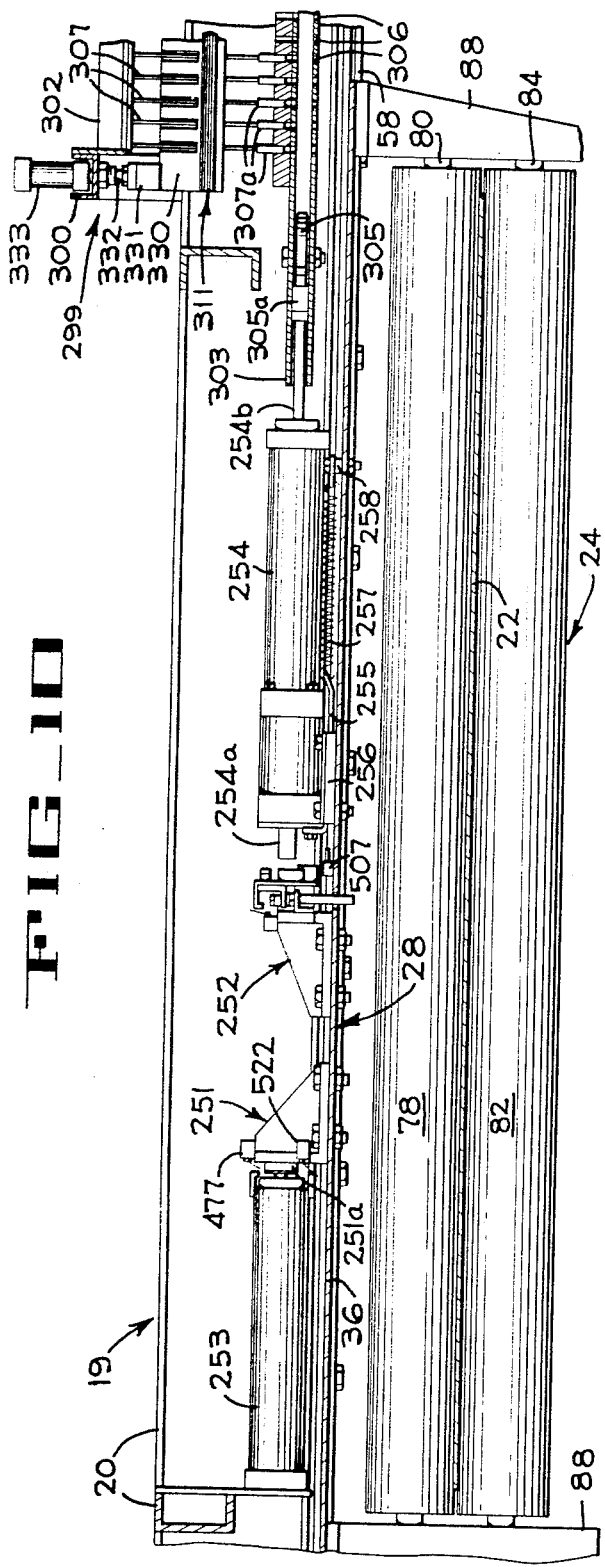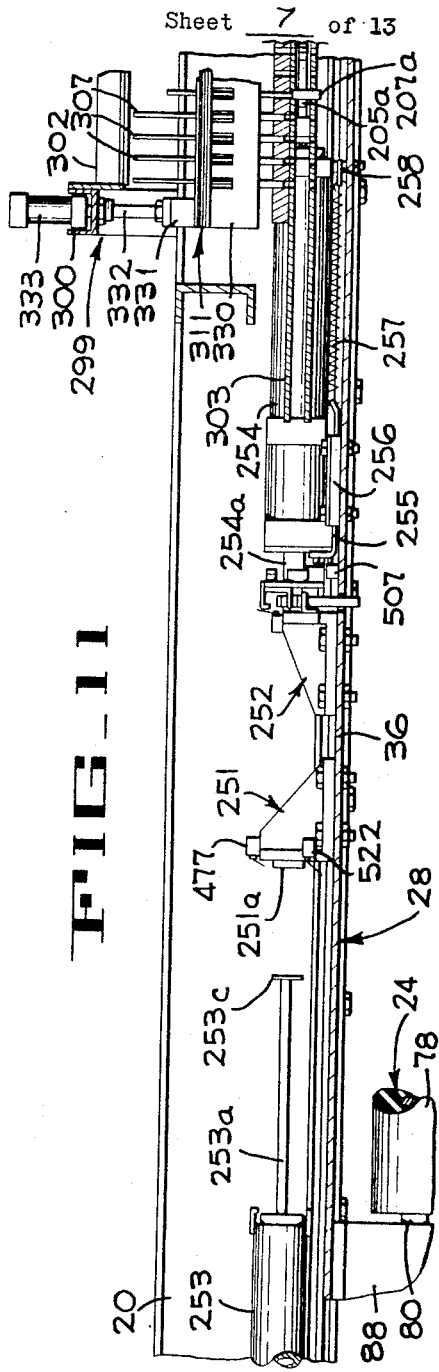

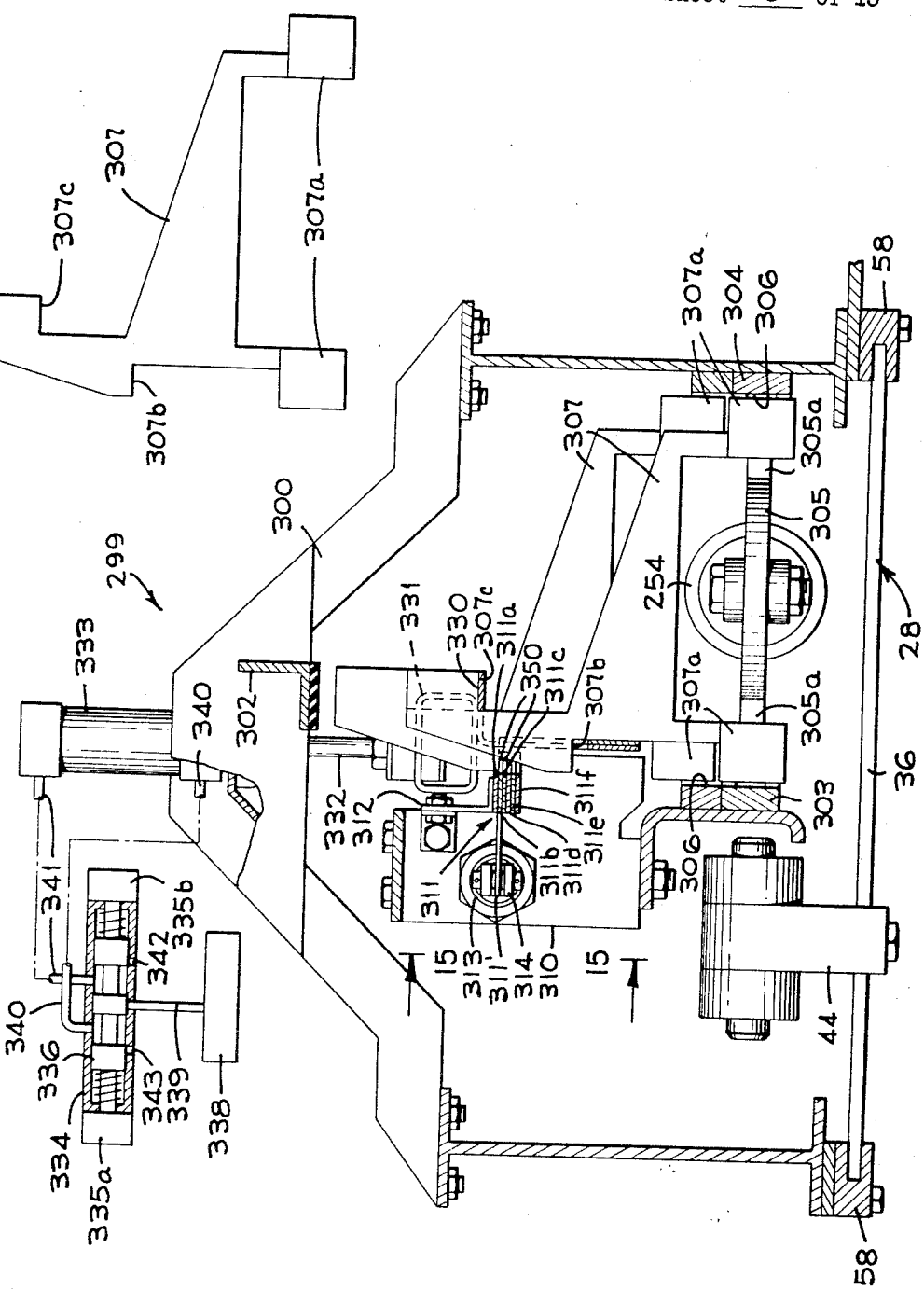

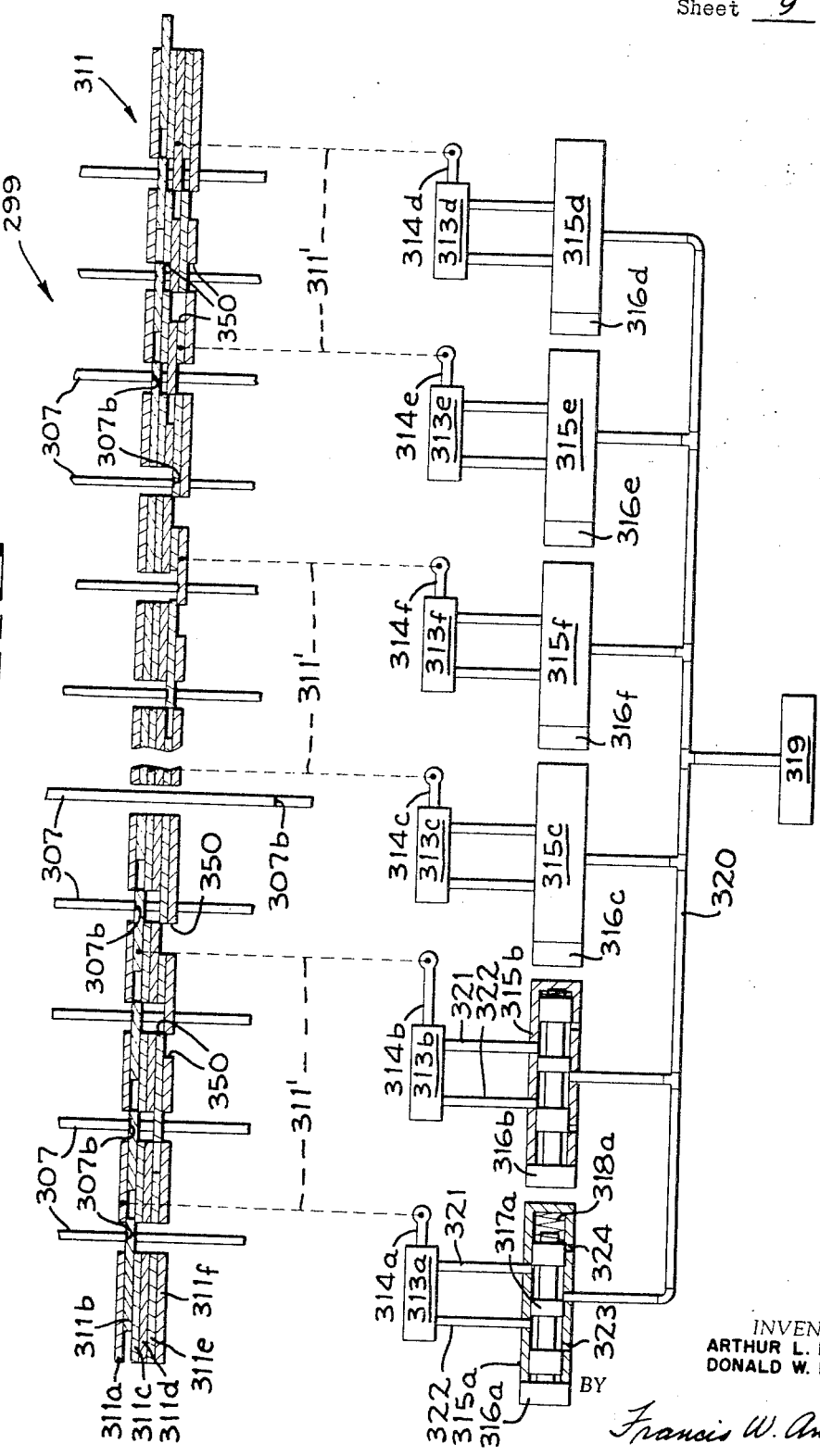

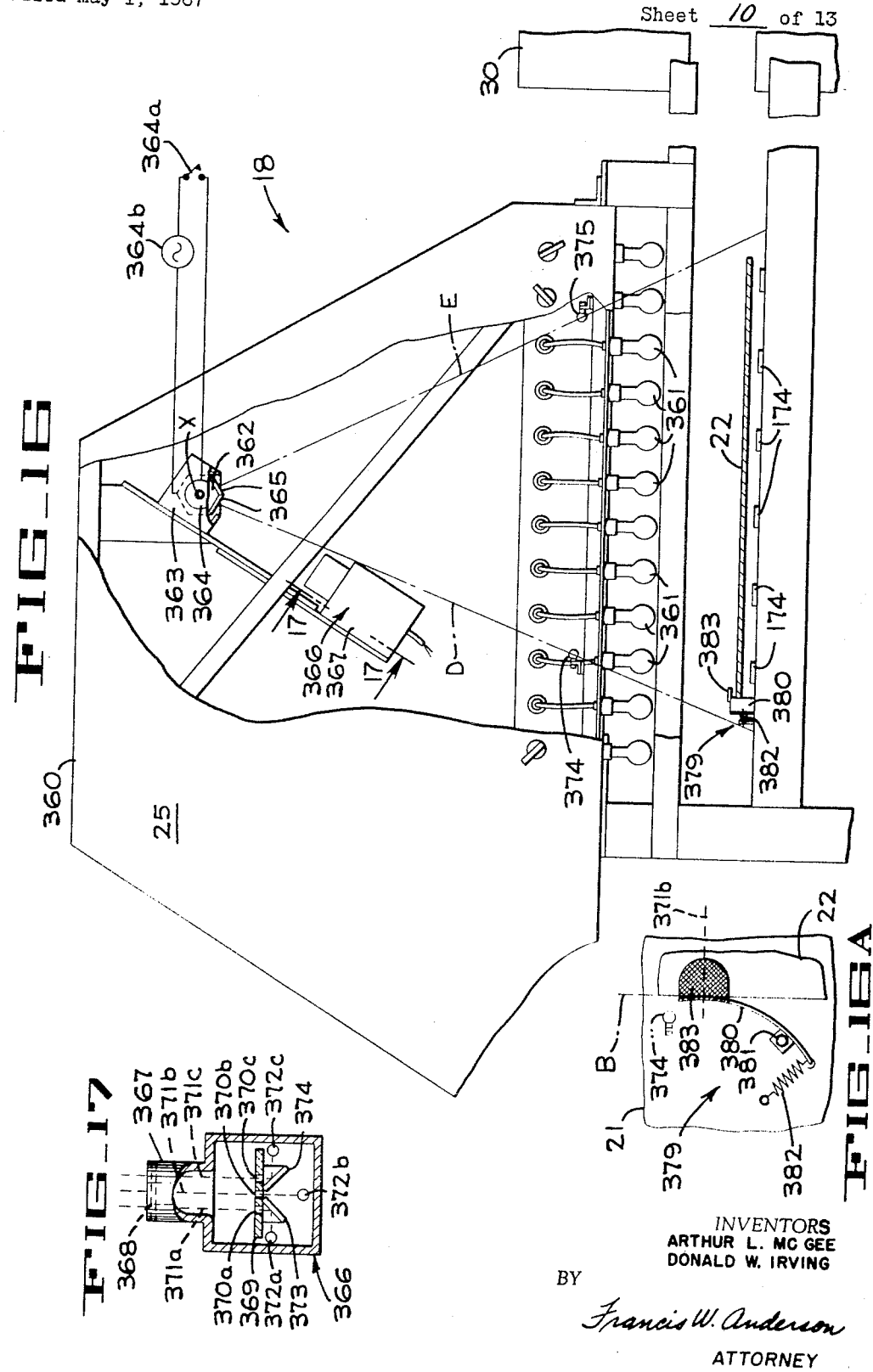

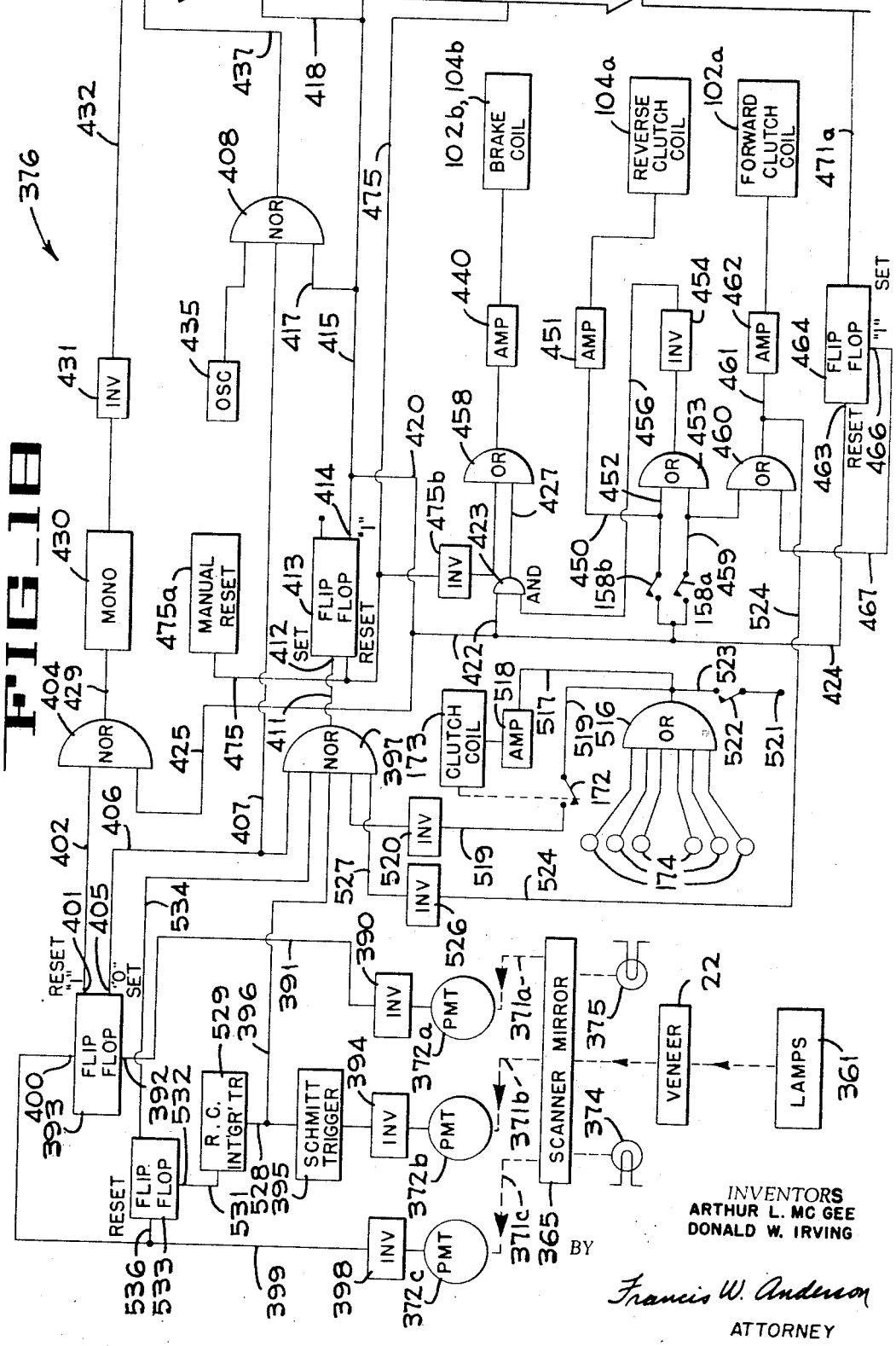

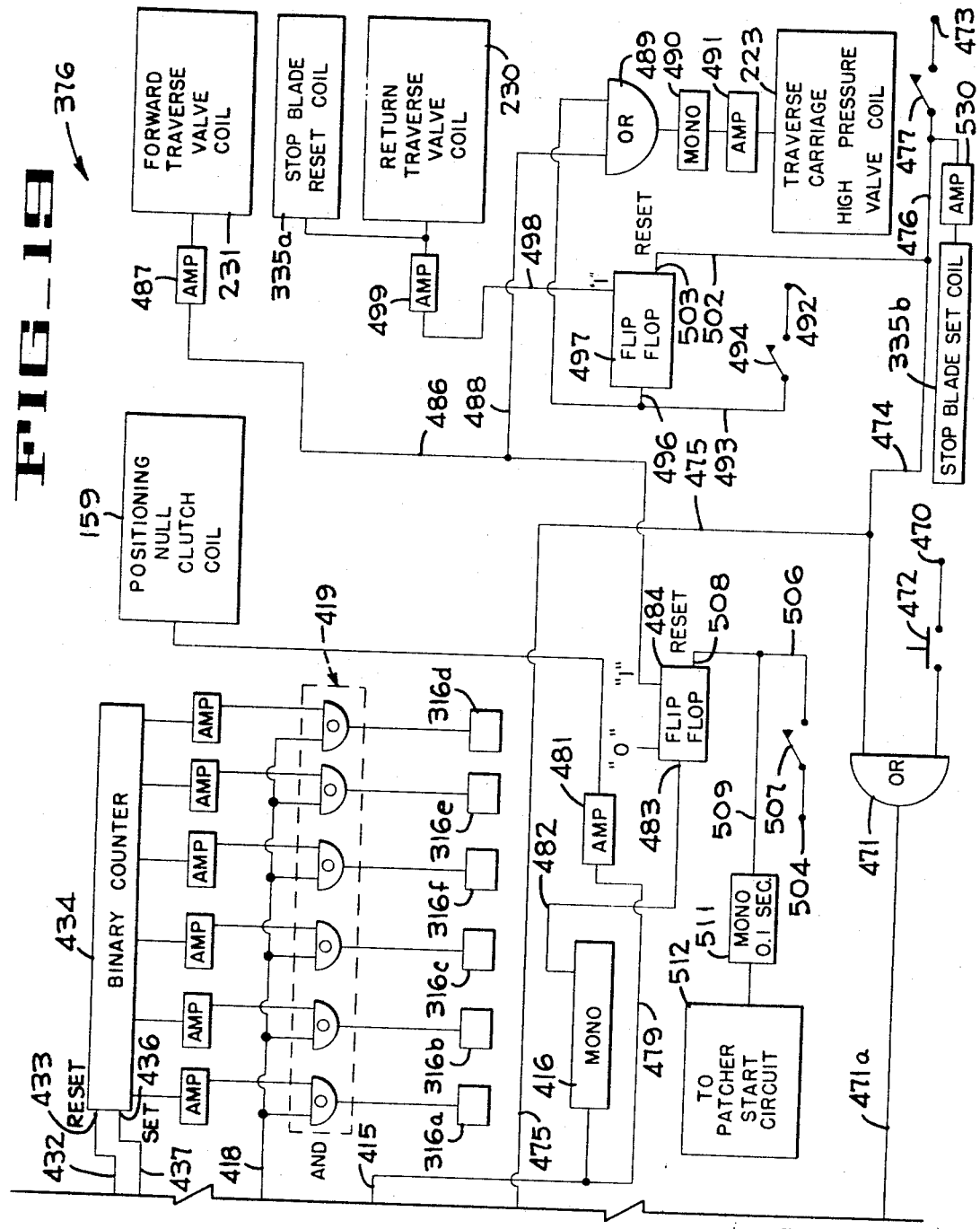

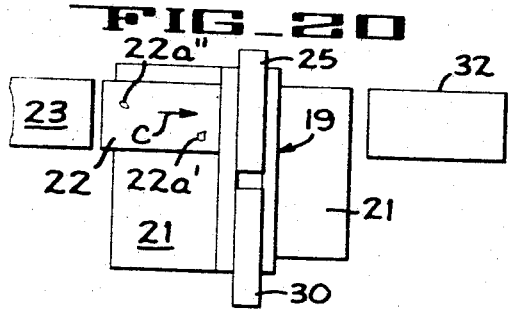
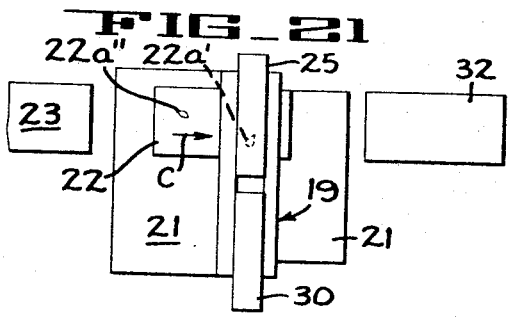
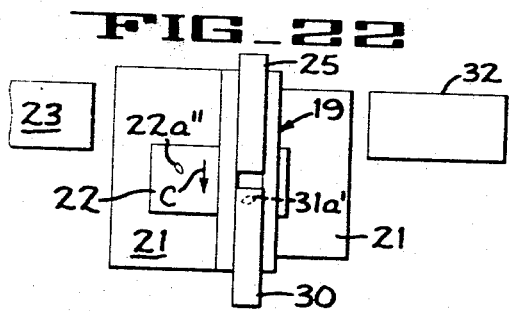
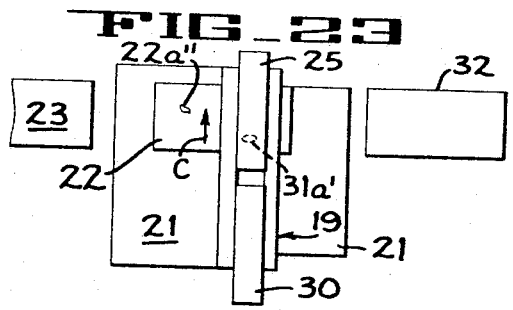
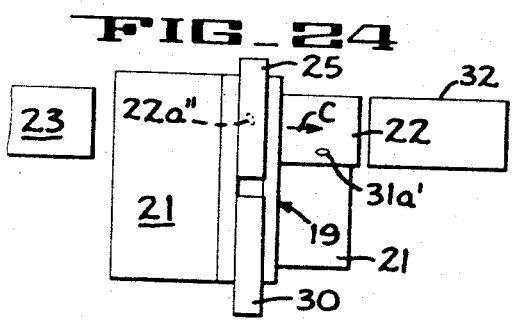
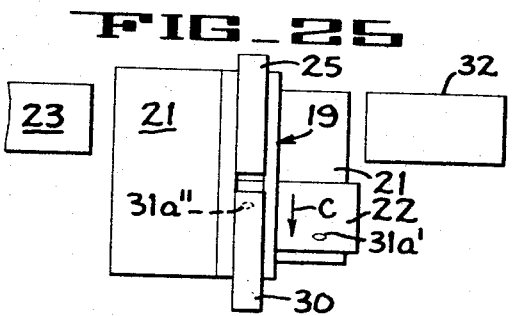
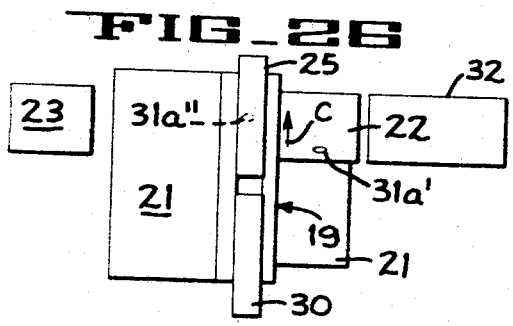
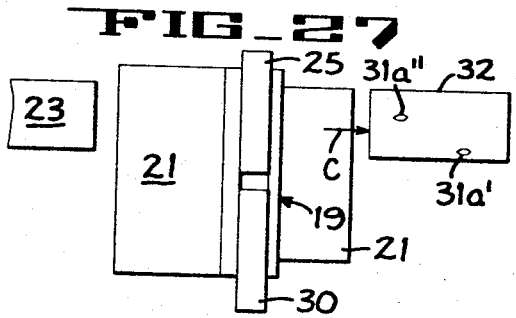

3,446,255
SCANNER LOCKOUT MECHANISM
Arthur L. McGee, San Jose, and Donald William Irving, Los Gatos, Calif., assignors to FMC Corporation, San Jose, Calif., a corporation of Delaware
Filed May 1, 1967, Ser. No. 635,221
Int. Cl. B27d 5/00; B27c 9/00
U.S. Cl. 144—2                                    11 Claims

ABSTRACT OF THE DISCLOSURE

A sheet patching machine having a conveying system for rapidly moving veneer sheets along a linear path through a defect scanner that is disposed in transverse alignment with a plywood patcher. A control system associated with the conveying systems and responsive to the position and shape of the sheet being scanned for defects to prevent detected defects near any of the marginal edges of the sheet to interrupt the normal forward movement of the sheet, while detected defects disposed inwardly of the sheet a predetermined distance from each marginal edge will stop the defect on the scanning plane and will thereafter effect movement of the detected defect into axial alignment with the patching head.

BACKGROUND OF THE INVENTION

This invention pertains to a sheet patching machine having a conveying system for moving sheet material such as veneer sheets used in plywood manufacture past a defect scanner which locates defects in the sheets and rapidly moves each defect, in turn, into exact position to be patched. The conveying system of the present invention is associated with a patch applying machine of the type disclosed in U.S. Letters Patent No. 2,336,704 which issued to Skoog on Dec. 14, 1943. The scanning device associated with the present conveying system, and the controls and circuitry for operating the conveying system are similar to that disclosed in Roberts et al. application for U.S. Letters Patent Ser. No. 634,951 which was filed on even date herewith and is assigned to the assignee of the present invention.

Other applications which are assigned to the assignee of the present invention and which were filed on even date herewith are covered by application Ser. Nos. 635,113; 635,220; 635,238; and 635,239.

Veneer sheets used in the manufacture of plywood have heretofore been fed manually into patching machines such as that disclosed in the Skoog patent mentioned above for the purpose of patching defects therein. Manual manipulation of the sheets is not only slow but is quite tedious work since the operator must visually detect the defects in each sheet which average about 10 defects per sheet and may be quite small, and then must accurately and manually move the sheets, which are generally about nine feet long and between 51 to 54 inches in width, so that each defect, in turn, can be patched.

The veneer patching machine disclosed in the above-mentioned copending application discloses one type of conveying system which includes a carriage to which each sheet is clamped so that the carriage can move the sheet through a sensor and a patching machine. This carriage is moved longitudinally, by another carriage during the defect sensing operation and upon detection of a defect is moved laterally. Because two carriages are used, both carriages must be returned to the starting position each time a patched sheet is discharged and another sheet is clamped to the carriages for processing.

The above mentioned carriages are relatively heavy, and accordingly, renders the rate of movement of the sheets through the machine rather slow since the weight or inertia of the carriage adversely affects the acceleration and deceleration, respectively, each time the carriage is started and thereafter stopped.

SUMMARY OF THE INVENTION

In accordance with the present invention the above-mentioned longitudinally and transversely movable carriage is replaced by a carriage which moves transversely only and which carries a pair of transversely extending rollers each of which cooperates with a resiliently mounted idler roller for clamping the particular sheet being processed therebetween and for moving the sheet longitudinally from one end of the machine to the other during the defect sensing operation. During the sensing operation the rollers are selectively driven in opposite directions so as to accurately locate a detected defect on the vertical transverse scanning plane, which plane passes through the center of both the sensor and the patcher. The carriage, including the rollers, is then reciprocated transversely of the machine along said sensing plane until the sensed defect is in exact alignment with a longitudinally extended vertical plane that passes through the patching head of the patcher. The patcher is then actuated to apply the necessary patch and immediately thereafter the carriage and sheet are returned to a longitudinal sensing path under the sensor. After all the defects in the sheet have been sensed and patched, the sheet is moved longitudinally out said other end of the machine. Thus, one sheet at a time or a continuous row of sheets which are spaced a short distance apart may be run through the machine since there is no need to return a carriage to the feed position each time one sheet is patched and discharged.

The operation of the sheet patching machine of the present invention is controlled by signals from the sensor in a manner quite similar to that described in the above-mentioned copending application, and is effective to move the sheets longitudinally through the machine at an average speed of about 3.3 feet per second. The conveying system operates at a rate which requires on the average of about 2.55 seconds per patch, i.e., from the moment a defect is detected until a patch is applied and the sheet is returned to the sensing path an average time of about 2.55 seconds elapses. About 0.7 second of this processing time is required for applying the patch.

It is therefore an object of the present invention to provide an improved sheet patching machine.

Another object is to provide a sheet patching machine which moves the sheets through the machine from one end of the machine to the other.

BRIEF DESCRIPTION OF THE DRAWINGS

FIGURE 1 is a diagrammatic perspective illustrating the sheet patching machine of the present invention.

FIGURE 2 is a plan of a portion of the machine of FIGURE 1 illustrating the sensing zone of the machine and the carriage which is in a retracted position.

FIGURE 3 is a longitudinal side elevation looking in the direction of lines 3—3 of FIGURE 2.

FIGURE 4 is an enlarged vertical section taken along lines 4—4 of FIGURE 2 illustrating the transversely movable carrier with one pair of clamping rollers shown engaging a veneer sheet being scanned for defects, and another sheet approaching the scanning plane.

FIGURE 5 is an enlarged transverse vertical section taken along lines 5—5 of FIGURES 2 and 4 illustrating the carrier and a disconnectable drive therefor.

FIGURE 6 is an enlarged horizontal section taken along lines 6—6 of FIGURE 3 illustrating a drive control device for the longitudinal movement of the sheets.

FIGURE 7 is a vertical section taken along lines 7—7 of FIGURE 6.

FIGURE 8 is a perspective of a cooperating pair of cams used in the control device of FIGURE 6.

FIGURE 9 is a diagrammatic perspective taken in the direction of arrow 9—9 of FIGURE 2 illustrating the pneumatic controls and power unit for the transverse carriage.

FIGURE 10 is an enlarged vertical section taken along lines 10—10 of FIGURE 2 illustrating the carriage in its retracted position and shock absorbers carried by the carriage.

FIGURE 11 is a section similar to FIGURE 10 but illustrating the carriage in its extended positions against a selected one of the stop blades.

FIGURE 12 is an enlarged perspective taken in the direction of arrows 12—12 of FIGURE 2 illustrating the carriage stopping device.

FIGURE 13 is an enlarged vertical section taken along lines 13—13 of FIGURE 2, illustrating the stopping device of FIGURE 12.

FIGURE 14 is an enlarged elevation of one of the carriage stopping blades.

FIGURE 15 is an enlarged diagrammatic transverse elevation taken generally along lines 15—15 of FIGURE 13.

FIGURE 16 is an enlarged diagrammatic elevation of the scanner looking in the direction of arrows 16—16 of FIGURE 2.

FIGURE 16A is a plan view illustrating an edge lockout device for preventing the detection of defects on one longitudinal edge of a sheet.

FIGURE 17 is an enlarged diagrammatic elevation taken in the direction of arrows 17—17 of FIGURE 16 illustrating the sensing member of the scanner.

FIGURES 18 and 19 when placed end to end define a logic circuit which controls the actuation of the several components of the machine in timed relation.

FIGURES 20–27 are operational views illustrating progressing steps of the machine as it detects two defects in a sheet and patches the same.

DESCRIPTION OF THE PREFERRED EMBODIMENT

In general, the veneer patching machine 18 (FIGS. 1 to 5) of the present invention uses a single carriage conveying system 19. The veneer patching machine 18 includes a fixed frame 20 having a support table 21 upon which sheets of veneer 22 have defects 22a therein are manually fed from a stack 23 into the inlet end of of the machine. The sheets are placed in a scanning path defined by longitudinal lines A and B (FIG. 2) by an operator who pushes the forward edge of each sheet, in turn, into engagement with a forward pair of driven rubber covered clamping rollers 24 which move each sheet along said scanning path below a transversely extending scanner 25. The first pair of clamping rollers 24 advances the sheet in the forward direction as indicated by the arrows C to a trailing pair of rubber covered clamping rollers 26 and, shortly after the trailing pair of rollers 26 clears the first sheet from the first pair of rollers 24, another sheet is inserted between the first pair of rollers 24. Thus, the two pairs of rollers cooperate to pass either single sheets or a row of relatively closely spaced sheets under the scanner 25 through the machine in the direction of arrows C from one end of the machine to the other.

When passing through the scanner, each defect is accurately located both longitudinally and laterally in the machine 18. Upon detection of the defect, the scanner imparts certain signals to a control system, to be described hereinafter, which first effects the stopping of forward movement of the sheets by stopping the clamping rollers 24 and 26 and then usually reverses the movement of the clamping rollers so as to overcome inertia and accurately position the defect in the vertical scan plane, which plane extends transversely of the machine 18. After locking the sheet, or sheets, gripped by the pairs of rollers 24 and 26 from further longitudinal movement, a transversely movable carriage 28, which carriage supports the two pairs of rollers, is moved under the control of signals from the scanner with the sheet or sheets attached thereto transversely of the scanner path to accurately position the detected defect in a vertical plane which extends longitudinally of the machine 19.

Upon arrival of the defect at the line of intersection of the two planes, which line passes through the center of a patching head of a patcher 30, the patcher is placed in operation to first cut the defect from the sheet and thereafter seal the opening with a veneer patch 31. Upon completion of the patching operation, the carriage 28 and the sheet or sheets attached thereto are returned to a position within the scanning path at which time the pairs of clamping rollers 24 and 26 are again driven to advance the sheet being scanned in the direction indicated by arrows C until the next defect is detected at which time the patching operation is repeated. After all defects in the sheet have been detected and patched, the pair of trailing rollers 26 release the patched sheet on the discharge end of the table 21 for removal by an operator who places the patched sheet onto a stack 32 at the discharge end of the machine, which stacking operation may be aided by a pair of driven clamping rollers 33.

More particularly, the transversely movable carriage 28 (FIGS. 4 and 5) comprises slide plates 36 and 38 which are interconnected by a yoke 40 so that both plates will move transversely in unison in response to actuation of a pneumatic power unit 42 (FIGS. 2 and 4) which has its cylinder anchored to the frame 20 and its piston rod 42a pivotally connected to a bracket 44 bolted to the slide plate 36. As indicated in FIGURE 4, one end of the yoke 40 is bolted directly to the slide plate 36 while the other end has a downwardly projecting tab 46 formed thereon which tab abuts a resilient block 48 that is firmly held between the tab and a bracket 50 by a volt. The bracket 50 is welded to a downwardly extending roller support bracket 52 that is bolted to the plate 38. The resilient block 48 permits slight misalignment of the plates 36 and 38 and thus avoid binding during transverse movement thereof. The plate 38 is slidably received in ways 54 and 56 bolted to the frame 20, and the plate 36 is slidably received in similar ways 58 (FIGS. 4 and 10) which are likewise bolted to the frame 20.

As best shown in FIGURE 5, the trailing pair of rollers 26 includes an upper driven roller 60 that is mounted on the shaft 62 journaled in the roller supporting bracket 52 and a similar bracket 64 spaced therefrom and bolted to the plate 38. The brackets 52 and 64 each have a vertical slot 66 (FIG. 4) therein which slidably receives a slotted bearing block 68 that is resiliently urged upwardly by a spring 70 and associated adjustment device 72. The bearing block 68 rotatably receives the shaft 74 of a lower idler roller 76 that is urged upwardly by the springs 70 with sufficient force to clamp a sheet 22 therebetween and prevent slippage relative thereto during longitudinal or transverse movement of the carriage 28.

The forward pair of clamping rollers 24 are similarly mounted, and include an upper driven roller 78 secured to a shaft 80 and a lower idler roller 82 secured to a shaft 84. The driven shaft 80 is journaled in bearings 86 fixed to spaced brackets 88 which brackets are bolted to the plate 36. A vertical slot 90 formed in each bracket 88 slidably receives a bearing block 92 that has the shaft 84 journaled therein and is resiliently urged upwardly by springs 94 disposed between the associated bearing blocks 92 and an adjustment device 96 adjustably secured to the bracket 88. The springs 94 are tensioned sufficiently to prevent slippage of a sheet between the rollers 78 and 82, which are covered by resilient sleeves such as rubber, at any time during the operation of the machine.

As mentioned previously, the forward clamping rollers 24 and rear clamping rollers 26 are normally driven in the direction of arrow C which will advance the sheets 22 from the right side of FIGURE 4 to the left side thereof. However, due to the high operating speeds, it has been discovered that the effect of inertia acting on the rollers and sheets being advanced in the direction of the arrows C during the scanning operation will preclude immediate stopping of the sheets upon detection of a defect and will move the defect slightly beyond the scanning plane. Accordingly, a drive system 100 (FIG. 3) for the driven rollers 60 and 78 will effect alternate movement of the sheet in opposite directions until the defect in the sheet is accurately positioned on the scanning plane. During normal operation this accurate positioning step is usually accomplished by a single short reversal of movement of the sheet being scanned.

The drive system 100 (FIG. 3) for the clamping rollers comprises a forward motor 102 having a well-known magnetic clutch and magnetic brake unit connected thereto, and a reversed motor 104 also having a magnetic clutch and magnetic brake unit connected thereto. It will be understood that when the clutch of one of the motors is energized the brake of that unit will be de-energized and the output shaft of that clutch-brake unit will then be driven. Similarly when the brake of the clutch-brake unit of one of the motors is energized the clutch of that unit, as well as the clutch of the other unit, will be de-energized and the output shaft will be magnetically locked in fixed position by energization of the brake. It will also be understood that when the clutch of one unit is energized the clutch of the other unit will be de-energized.

The output shaft 106 of the forward motor 102, and the output shaft 108 of the reverse motor 104 are connected by a chain drive 110 to an idler shaft 112 journaled on the frame 20. The idler shaft 112 is connected by a chain drive 114 to a stub shaft 116 that is journaled on the frame 20 and is disposed in axial alignment with the shaft 80 (FIG. 4) of the upper drive roller 78 of the forward clamping pair of rollers 24. Another chain drive 118 is trained around a sprocket 120 keyed to the stub shaft 116, around an idler sprocket 122, and around a sprocket 124 equal in size to the sprocket 120 and keyed to a stub shaft 126 journaled on the frame 20 and disposed in axial alignment with the shaft 62 (FIG. 5) of the upper drive roller 60 of the trailing pair of rollers 26.

In order to drive the clamping rollers 24 and 26 when the rollers are in the scanning path, the stub shaft 126 is connected at that time in driving engagement to the shaft 62 of the upper drive roller by a toothed clutch 130 (FIG. 5) which includes a driving section 132 keyed to the stub shaft 126 and a driven section 133 keyed to the shaft 62. A similar clutch (not shown) connects the stub shaft 116 to the roller shaft 80 of the forward clamping rollers 24 when the rollers are in the scanning path. When the pairs of clamping rollers are moved out of the scanning paths, the two halves of each toothed clutch merely separate thereby positively disconnecting the rollers from the roller drive system 100.

In order to stop the detected defect precisely on the transverse scanning plane, and to prevent the detection of defects within about three inches of the usually ragged leading edge of the veneer sheet and within about three inches of the trailing edge of the sheet, a longitudinal drive control device 140 (FIGS. 6 and 7) is provided. The device 140 is confined within a housing 142 bolted to the frame 20 in position to receive a reduced diameter portion 144 of the shaft 116 (FIG. 3). A large diameter pulley 146 (FIGS. 6 and 7) and a small diameter pulley 148 are set screwed to the shaft portion 144. The large diameter pulley 146 drives a belt 150 that is trained around a small diameter pulley 152 connected to a shaft 154 (FIG. 6) on which one plate of a position bracketing null clutch 155 is mounted. The other plate of the null clutch 155 is connected to a shaft 156 which has two cams 157a and 157b (FIGS. 7 and 8) mounted thereon. As shown in FIGURE 7, cam 157a operates a switch 158a and cam 157b operates a switch 158b. The null clutch 155 is small with relatively little inertia, and when an electromagnet 159 therein is energized, the cams almost instantly begin to rotate in accordance with rotation of the pairs of clamping rollers 24 and 26. The shaft 156 rotates clockwise (FIG. 7) when the pairs of rollers 24 and 26 drive the sheet forwardly, and rotate counterclockwise when the sheet is driven by the rollers in a reverse direction. When the roller shaft 116 rotates clockwise, switch 158b is closed; when shaft 156 rotates counterclockwise, switch 158a is closed. When the electromagnets 159 of the null clutch is de-energized, the cams are disengaged and remain at rest until the electromagnet 159 of the clutch 155 is again energized.

The small diameter pulley 148 is connected by a belt 160 to a large diameter pulley 161 which is keyed on an idler shaft 162 having a small diameter pulley 163 on its other end. The small diameter pulley 163 is connected to a large diameter pulley 164 by a belt 166. The pulley 164 is keyed to a shaft 167, and due to the above-described speed reducing belt drivers, drives the shaft 167 less than one complete revolution during the movement of the longest veneer sheet past the scanner 25.

The shaft 167 has one plate of a scanner lockout null clutch 168 mounted thereon. The other plate of the lockout null clutch 168 is connected to a cam shaft 169 which has a cam 170 mounted thereon. The cam 170 operates a normally open switch 172, and closes the switch after the clutch 168 has been engaged and the clamping rollers 24 and 26 have moved the forward end of the sheet a distance of about three inches past the scanning plane in the normal direction of travel C of the sheets. As will be indicated in more detail later, the lockout null clutch 168 includes an electromagnet 173 which is energized to engage the clutch 168 by movement of the leading edge of the sheet to be scanned past six photoelectric cells 174 (FIG. 2). The photoelectric cells 174 are positioned below the plane of travel of the sheets, and about three inches upstream of the scanning plane so that the clutch 168 will be energized when the leading edge of the sheet is about three inches from the scanning plate. However, the cam 170 does not close the switch 172 by means of a lobe 170a until the leading edge moves about three inches past the scanning plane. The cam 170 holds the switch 172 open until the trailing edge of the sheet moves away from the photoelectric cells 174 thereby deenergizing the clutch 168 permitting a torsion spring 176 to return the shaft 169 to its starting position and since the photoelectric cells 174 are about three inches upstream of the scanning plane, will lockout the scanner for the trailing three inch section of the sheet.

The spring 176 has one end connected to a collar 178 pinned to the shaft 169 and its other end secured in one of several holes in a stationary support bracket 179. The collar 178 also includes a tongue 180 which engages a fixed stop 181 to accurately stop the cam shaft 169 in starting position after the null clutch 168 has been de-energized.

After the scanner 25 detects a defect by scanning transversely of the movement of the veneer sheet, and after the longitudinal drive control device 140 accurately stops the detected defect in the scanning plane, the carriage 28 is moved transversely of the longitudinal scanning path to position the defect in alignment with the patching head of the patcher 30. This transverse movement is initiated by the above-mentioned pneumatic power unit 42 and a pneumatic control circuit 190 (FIG. 9) which starts movement of the piston rod 42a by applying air at about 80 p.s.i. thereto and shortly thereafter drops the pressure to about 40 p.s.i. In this way, the carriage 28 is rapidly accelerated from its starting position and has about one-half of this power terminated prior to reaching its stopping point.

The circuit 190 receives high pressure air from a source 213 of air under pressure that is connected by line 214 to the inlet of a pressure regulating valve 215 having an outlet connected to line 216. The outlet pressure of the valve 215 is adjustable by member 217, and the pressure at the outlet is set at a high value of about 80 p.s.i. Line 216 is connected to the inlet of a second pressure regulating valve 218 which has an outlet connected to line 219. The outlet pressure of valve 218 is adjustable by member 220, and the pressure at the outlet is set at a low value of about 40 p.s.i. A blocking valve 221 has an inlet connected to line 216 and an outlet connected to line 219. When the shiftable valve member 222 of valve 221 is in the position shown in FIGURE 9, flow of air through the valve is open. When the solenoid 223 of the valve 221 is energized to shift valve member 222 to the left as viewed in FIGURE 9, air from line 216 is blocked by the core 222.

Line 219 is connected to the pressure port of valve 224. The valve 224 has two exhaust ports 225, 226 open to the atmosphere, and has two motor ports connected to motor lines 227, 228. Motor line 227 is connected to one end of cylinder 42 and motor line 228 is connected to the opposite end of cylinder 42. Valve 224 has a shiftable valve member 229 connected at one end to the solenoid 230 and connected at the opposite end to solenoid 231. When solenoid 230 is energized (and solenoid 231 is de-energized) air from line 219 passes through the valve 224 to line 227 to move the carriage to the left as viewed in FIGURE 9. Air from the left end of cylinder 42 is vented to the atmosphere through lines 228, valve 224, and exhaust port 226. When solenoid 231 is energized (and solenoid 230 de-energized) air from line 219 passes through the valve 224 to line 228 to move the carriage to the right. Air from the right end of the cylinder is vented to the atmosphere through line 227, valve 224 and exhaust port 225.

The pressure in line 216 is maintained at about 80 p.s.i. by valve 215. The pressure in line 219 is held at 40 p.s.i. by valve 218, but only while valve 221 prevents communication between line 216 and 219. When solenoid valve 223 is de-energized and valve 221 is open to connect line 216 to 219, and at this time the pressure in line 219 will raise to about 80 p.s.i. As mentioned above, a high pressure is initially applied to one end or the other of cylinder 42 to accelerate the carriage 28 rapidly. After the carriage has been accelerated, solenoid 223 is energized to drop the pressure to facilitate stopping the carriage. Thus, the carriage is moved in the minimum elapsed time from one position to another position.

In order to gently terminate transverse movement of the carriage 28, two stops 251, 252 (FIGS. 10 and 11) are mounted back to back on the upper surface of the carriage 28. Stop 251 engages the plunger 253a of a shock absorber 253 when the carriage 28 is moved to the left as viewed in FIGURES 10 and 11 from the patcher back to the scanning path. The shock absorber 253 is mounted on the frame 20 and the plunger 253a thereof decelerates the carriage when the carriage 28 is rapidly returned from the patcher to bring the carriage to a gentle stop when the plunger 253a is fully retracted as shown in FIGURE 10. With the carriage 28 in this position, a veneer sheet 32 gripped by either or both pairs of rollers 24 and 26 will lie in the scanning path between A, B (FIG. 2). The stop 251 has a hard rubber pad 251a secured thereon which is engaged by the disc 253c on the plunger 253a of shock absorber 253.

Stop 252 engages an abutment block 254a of a shock absorber 254 (FIGS. 10–12) which has flanges 255 on each side slidably received in guides 256. The guides 256 are secured on the carriage 28, and the entire shock absorber 254 is shiftable on the carriage with respect to the fixed guides 256 between a position to the left as shown in FIGURE 11 with block 254a in engagement with stop 252, and a position to the right, as shown in FIGURE 10. Springs 257 on each side of the shock absorber are connected under tension between studs 258 on the carriage 28 and flanges 255 on the shock absorber to urge the shock absorber away from the stop 252.

The stop 252 may be merely a fixed abutment but is preferably a four-position adjustable stop which is under the control of a primary counting circuit that is activated by the scanner 25 and which determines the extent of lateral movement of the carriage 28. Upon detection of a defect, signals from the counter activates the adjustable stop to selectively place one of four abutment blocks of slightly different length into position to be engaged by the abutment block 254a of the shock absorber 254. The adjustable stop 252 is fully described and claimed in the above first-mentioned copending Roberts et al. application and such description is included herein by reference. Accordingly, the detailed description of these steps will not be repeated herein. However, it will be understood that the adjustment features of the stop 252 may be employed in the present veneer patching machine if a very fine lateral adjustment of the carriage 28 is desired.

A lateral positioning mechanism, indicated generally at 299 (FIGS. 10–14) is mounted on the frame 20 to control the lateral position of carriage 28. The lateral positioning mechanism operates in response to data from the scanner to stop the carriage 28 with the defect in the veneer sheet aligned with the patching head of the patcher. A pair of spaced arches 300, 301 (FIG. 1) are mounted on the frame 20 and have a transversely extending angle member 302 extending therebetween. A pair of spaced elongated guide tracks 303, 304, as shown best in FIGURE 12, are connected to frame 20 and extend transversely below member 302. The guide tracks 303 and 304 receive a bumper 305 therein which is connected, as shown in FIGURES 10, 11 and 12, to the front of the plunger 254b of shock absorber 254.

The guide tracks 303 and 304 each have a plurality of vertical slots 306 each of which receives a stop blade 307. Each blade 307, which is shown in FIGURE 14, has depending legs with thicker feet 307a which define stops for engagement by shoulders 305a of bumper 305 when the blade shifts to an effective position. When the shoulders 305a of bumper 305 engages a particular stop as shown in FIGURE 11, the plunger 254b fully retracts and decelerates the carriage 28 on which shock absorber 254 is mounted. The carriage 28 will be stopped in a particular lateral position defined by the particular stop blade which was lowered in response to a signal from the counter. There are a plurality of blade stops 307 (sixty-four, for example), which normally are held in a raised position out of the path of bumper 305. Each blade, however, can be selectively lowered to define a stop for carriage 28 at a particular position, depending on the blade selected.

As shown best in FIGURES 13 and 14, a series of spaced vertical plates 310 are connected to longitudinal carriage 28. A plurality of selector bars 311 (designated 311a, 311b, 311c, 311d, 311e and 311f) are supported by the plates 310 and clips 312 secured to the plates. Cylinders 313 (designated 313a, 313b, 313c, 313d, 313e, and 313f) one for each selector bar (see FIGURE 15) are mounted between the plates 310. Each cylinder has a piston (not shown) which is connected to a connecting rod (314a, 314b, 314c, 314d, 314e and 314f) attached by a tab 311' forming a continuation of the associated selector bar 311a–f. Valves 315a, 315b, 315c, 315d, 315e and 315f have solenoids 316a, 316b, 316c, 316d, 316e and 316f, respectively. When solenoid 316a is de-energized, valve member 317a is urged to the left by spring 318a. Air under pressure from source 319 passes through pressure line 320 to the pressure port of the valve. Air under pressure passes through the valve to motor line 321, connected to a motor port of the valve. Line 321 is connected to one end of the cylinder 313a, on one side of the piston therein. Air behind the cylinder is vented through motor line 322, through the valve, to exhaust port 323. When solenoid 316a is energized and the valve member 317a is shifted to the right, air from pressure line 320 passes through the valve to line 322 to move the piston to the right as viewed in FIGURE 15) and extend the connecting rod thereof. Air from in front of the piston is vented through line 321, valve 315a and exhaust port 324 thereof.

For purposes of illustration, assume there are sixty-four stop blades 307, each received in one opposing pair of vertical slots 306 in the guides 303 and 304. The vertical slots are equally spaced in the lateral direction (as shown in FIGURE 12) so that the blades 307 are equally spaced in the lateral direction. All of the blades 307 are identical and each has a shoulder 407b (FIGURE 14). The blades are shiftable vertically, and when all the blades are in their upper positions, the shoulders 307b extend over the group of selector bars 311. The blades are raised to their upper position by a laterally extending bar 330 (FIGURE 13) which is secured, at each end to a short horizontal tube 331. Each tube 331 is secured to a connecting rod 332 of a piston (not shown) slidably received in cylinder 333. A valve 334 has solenoid 335a and 335b which are connected to a shiftable valve member 336. When the solenoid 335a is energized and solenoid 335b de-energized the valve member 336 is shifted to the right (as viewed in FIGURE 13). With valve member 336 to the right, air under pressure from a source 338 passes through pressure line 339 to the pressure port of the valve. The air under pressure passes through the valve to motor line 340 which is connected to the lower end of cylinder 333, below the piston therein. Air from above the piston is vented through motor line 341, through the valve, and out exhaust port 342. When the solenoid 335b is energized and solenoid 335a de-energized, the valve member 336 is shifted to the left and air from pressure line 339 passes through the valve to motor line 341. Air below the cylinder is vented through motor line 340, valve 334, and exhaust port 343. When the valve is operated to raise the piston and connecting rod 332, bar 330 engages shoulders 307c (FIG. 14) on the blades to raise all the blades in unison.

Each selector bar 311f has sixty-four slots 350 positioned in accordance with a binary code to permit one stop only to be effective in any position of the six selector bars. It will be noted from FIGURE 15 that each selector bar assumes one of two possible positions, depending on whether the solenoid 316a to 316f of the valve 315a to 315f controlling the selector bar cylinder 313a to 313f is energized or de-energized. The slots of each bar are positioned so that thirty-two of the slots are aligned with the blades 307 and thirty-two are displaced from the top blades 307 in one position of the bar. When the bar is shifted to the other position, the thirty-two slots which were aligned with the blades are displaced therefrom and the thirty-two slots which were displaced from the blades are aligned with the blades. When a slot in a selector bar is aligned with a stop blade, that bar will permit that blade to drop through that particular bar; when a slot in a bar is displaced from a blade, the shoulder 307b of the blade will engage the bar and prevent the blade from dropping beyond that bar. Any blade which is blocked by any bar, will not fall into the path of bumper 305. A blade which is aligned with slots in all the bars will fall into the path of bumper 305 to define the stopping position of carriage 28.

When all of the bars are in, say, the left-hand position (as viewed in FIGURE 15) as are bars 311a, 311c, 311d, 311e, and 311f, one of the bars 311a will have the thirty-two slots 350 (considered from left to right) aligned with the blades 307 and the last thirty-two slots displaced from the blades. Another bar, 311c, will have the first sixteen slots aligned with the blades, the next sixteen slots displaced from the blades, the next sixteen slots aligned with the blades, and the last sixteen slots displaced from the blades. One bar, 311d, will have the first eight slots aligned with the blades, the second eight slots displaced from the blades, with the alternate sets of eight slots aligned with and displaced from the blades. One bar, 311b (which is shown in the extreme right-hand position), will, when in the left hand position, have the first four slots aligned with the blades, the second four slots displaced from the blades, and alternate sets of four slots aligned with and displaced from the blades. Another bar, 311f, will have the first two slots aligned with the blades, the next two slots displaced from the blades, and alternate sets of two slots aligned with and displaced from the blades. One bar, 311e, will have the first, third, fifth and every other slot aligned with the blade and will have the second, fourth, sixth, and all alternate slots displaced from the blades.

With this binary coded arrangement of slots 350 on the six selector bars 311a to 311f there are sixty-four different possible arrangements of the six selector bars, and each arrangement will result in alignment of all the slots at one blade only to permit one, and only one, of the sixty-four blades 307 to drop into the path of the bumper 305. Since each of the blades occupies a different lateral position on the frame 20, each blade will stop the carriage 28 (on which the shock absorber 254 is mounted) in a different lateral position.

The final lateral position of the carriage 28, however, does not depend only on which stop blade 307 is dropped. A finer adjustment of the final lateral position of the carriage is possible. It will be noted from FIGURE 10 that the shock absorber 254, which is shiftable on carriage 28, is normally held to the right by spring 257. When carriage 28 moves to the right to the desired patch position, the bumper 305 engages the particular selected blade 307 which is lowered in its guide slots 306 thereby completely retracting the piston rod 254b into the cylinder of the shock absorber 254. If the stop 252 is a non-adjustable stop, the particular blade which is lowered determines the extent of lateral movement of the carriage 28. However, if the stop 252 is a four-position adjustable stop as disclosed in the above first-mentioned Roberts copending application, the carriage 28 does not stop at this instant but continues to the right while shock absorber 254 remains stationary. With the particular one of the four different length abutment blocks of the adjustable stop 252 positioned by the binary counter in the path of the stop block 254a on shock absorber 254, the carriage 28 will come to rest only after the stop block 254a contacting the abutment block and the piston rod 254b of the shock absorber 254 is fully retracted. Thus, when the stop 252 is adjustable, the final lateral patching position of carriage 28 depends both on the selection of an abutment block of particular length on stop 252 and the selection of a particular stop 307 in a particular lateral position.

The patcher 30 (FIG. 1) is a conventional machine of the type shown, for example, in U.S. Patent 2,336,704 issued to P. F. Skoog on Dec. 14, 1943. As described in that patent, the machine is operable automatically to cut a defect out of a sheet of plywood veneer, cut a patch from a patch blank to fit the opening from which the defect was cut, and insert the patch in the opening. The machine has a clamping shoe which is actuated by the introduction of air under pressure into a chamber to clamp down on the plywood veneer sheet and hold the veneer sheet over a fixed die. A knife, which is actuated by a pneumatically actuated diaphragm descends inside the clamping shoe to cut the defect out of the plywood veneer. A pressure foot, which is actuated by the introduction of air under pressure into a cylinder, forces the cutout defect out of the veneer sheet. A patch blank is shifted into registration with the die by a carrier bar which is moved in one direction or the other by the introduction of air to one end or the other of a cylinder. A ram, which is actuated by a pneumatically operated diaphragm, is raised to force the patch blank thtrough the die, thereby trimming the blank to size. The ram insert the trimmed blank into the opening in the veneer sheet from which the defect was removed.

A control circuit for controlling the operation of the patcher 30 is fully disclosed in the first aforementioned Roberts et al. copending application. Since the patcher 30, per se, forms no part of the present invention, the details of this circuit will not be described herein. Reference may be had to the aforementioned application if a description of the patching circuit is desired.

The scanner 25, which is identical to that disclosed in the above-mentioned copending application, locates the defects, such as knot holes, by scanning the veneer sheet across the grain of the sheet transversely to the scanning path. As shown in FIGURES 2, 16 and 17, the scanner 25 has a housing 360 in the lower end of which two parallel rows of lamps 361 are mounted. The bottom of the housing is open so that the light from lamps 361 is cast downwardly onto a sheet of veneer 22 which is moved by the pairs of rollers 24 and 26 (FIG. 4) under the scanner. The scanner has a mirror holder 362 (FIG. 16) of hexagonal cross-section which is mounted on a bracket 363 connected to the scanner housing 360. The mirror holder 362 is rotated clockwise (as viewed in FIGURE 16) about a central axis X by electric motor 364 which is mounted on bracket 363 and receives power upon closing switch 364a from a power source 364b. Six mirrors 365, mounted on the mirror holder 362, reflect light from the veneer sheet 22 into a sensing member 366.

The sensing member 366 has a housing 367 (FIG. 17) in the upper end of which a lens 368 is mounted. The lens 368 focuses light from the veneer sheet onto a line on a masking plate 369 which is mounted in housing 367. The line on which the light focuses extends in the direction of plywood veneer travel (that is, longitudinally) and the masking plate has three apertures 370a, 370b, 370c on that longitudinal line. The light which passes through the center aperture 370b (designated as light path 371b) strikes a photomulitiplier tube 372b behind the masking plate and in line with aperture 370b. Two prisms 373, 374 are secured to the read of the masking plate over apertures 370a and 370c to direct the light (designated as light paths 371a and 371c, respectively) passing through those apertures to photomultiplier tubes 372a and 372c, which are behind the masking plate but not in line with the apertures 370a and 370c.

With this arrangement, light from three small spots 373a, 373b, 373c (FIG. 2) (each, say, $\frac{3}{16}$ of an inch in diameter) on the veneer sheet is reflected at any given instant by one of the mirrors 365 through the three apertures to act, respectively, on the three photomultiplier tubes 372a, 372b and 372c. Since the three apertures on the masking plate 369 are spaced apart in the longitudinal direction (say, for example, 2 inches between each aperture) the three spots seen at any instant by the photomultiplier tubes will be longitudinally spaced 2 inches apart. Since the electric motor 364 runs continuously during operation of the machine, the photomultiplier tubes sense successive spots laterally across the veneer sheet (form right to left as viewed in FIGURE 16). After one mirror has completed one lateral pass across the veneer sheet, the next mirror begins the next pass. The veneer sheet will have moved longitudinally from the beginning of one pass to the beginning of the next pass (say, for example, a distance of 0.04 inch) so that successive lateral scans, or passes, will be longitudinally displaced, and, therefore, the entire veneer sheet will be scanned. It should be noted that the lateral passes, although longitudinally displaced one from the other, overlap so that the entire surface of the sheet 22 (except the four edges which cannot be patched) will be scanned for defects.

Two longitudinally and transversely spaced lamps 374 and 375 are mounted in the scanner housing 360. Lamp 374 is mounted in an imaginary line D extending between the axis X of rotation of the mirror holder 362 and a short distance outwardly of the left edge of a sheet 22 (as viewed in FIGURE 16) passing under the scanner. As best shown in FIGURE 2 lamp 375 is in light path 371a at the beginning of a lateral pass across the veneer sheet, and lamp 374 is in light path 371c terminates slightly beyond the left side of the sheet at the end of a lateral pass across the veneer sheet. Lamp 375 acts only on photomultiplier tube 372a (FIG. 17) and lamp 374 acts only on photomultiplier tube 372c. Lamp 375 acts as an indicator which establishes a fixed reference point at the beginning of each scanning pass and lamp 374 acts as an indicator which establishes a fixed reference point at the end of each scanning pass. The effective scanning range is between the boundaries E, D defined by the lamps 375, 374, locking out the scanner signals from the scanner adjacent both longitudinal edges of the sheet for a depth of about 1⅜ inches inwardly of each edge since the patcher 30 cannot effectively patch an edge of the sheet. It is only photomultiplier tube 372b which senses the condition of the veneer, which it does by responding to the different character of the light reflected from a defect to produce a signal.

The means for locking out the scanner 30 for the first 1⅜ inches at the right longitudinal edge (FIG. 16) of the scanner is purely electrical and will be described later. A lockout device 379 for locking out defect signals at the left edge of the sheet includes an arcuate guide plate 380 (FIGS. 16 and 16A) which is pivotally mounted on a shouldered cap screw 381 secured to the table 21. A spring 382 connected between the arcuate guide plate 380 and the frame, urges the guide to ride against the left (FIG. 16) longitudinal edge of sheet as the sheet is moved through the scanning plane. Since the scanner reads defects as dark spots, the guide plate 380 has a screen 383 that is painted white secured thereto and extending over the sheet about 1.8 inches. The screen is located in the scanning plate, i.e., in the plane of light path 371b, so that as the light path approaches the left edge of the sheet it will be reflected from the white screen and will accordingly prevent detection of any defect in the last 1⅜ inches of the sheet. The use of a screen rather than a solid plate prevents a shadow from being cast on the sheet below the screen which shadow might be detected as a defect. Different width sheets may be processed without adjustment by always placing one edge of the sheet in position to engage the lockout device 379. It will also be appreciated that the guide 380, as well as the electrical lockout means acting on the right edge of the sheet, will effectively prevent sensing of defect on the edges even though the sheet may be obliquely moved through the machine, and that the 1⅜ inch preferred lockout range may be larger or smaller if desired.

The operation of the components of the veneer patching machine of the present invention is controlled by electrical circuitry which is presented by the logic circuit 376 (FIGS. 18 and 19). Prior to describing the parts of the logic circuit 376 and thereafter the operation of the machine as controlled by the logic circuit, the function of several types of internal circuits included in logic circuit 376 will be set forth.

In flip-flop circuits if a positive or true voltage is applied to "set" terminal, the output marked "1" develops a positive voltage (true state or true signal) and the output marked "0" develops no voltage (false state or signal). Upon directing positive voltage into the reset terminal of the flip-flop circuit, the output marked "1"

goes to zero voltage and the output marked "0" goes to a positive voltage.

In a NOR circuit, all of the input voltages must be zero (false) for the output to be at a positive voltage (true state). In an OR circuit, if any of the input voltages is positive, then the output will be a positive voltage. In an AND circuit, if any input voltage is at zero volts (false) the output will be at zero volts and, accordingly, to get a positive output all input signals must be positive. The Schmitt trigger merely makes the signal sharper. The integrator and the monostable circuits act somewhat as time delays, while the inverters invert the signal received from positive to zero, or zero to positive.

As shown in the logic control circuit 376 (FIGS. 18 and 19), the photomultiplier tube 372a (FIG. 18) responds only to light from lamp 375 which is reflected from the rotating mirror 365 onto the tube 372a to indicate the beginning of a scanning pass across the board. Photomultiplier tube 372a is connected to inverter 390 which is connected by line 391 to the input "set" terminal 392 of flip-flop 393. Photomultiplier tube 372b is connected to inverter 394 which is connected to Schmitt trigger circuit 395. A signal from trigger circuit 395 is transmitted by line 396 to an input terminal of NOR gate circuit 397. Photomultiplier tube 372c responds only to light from lamp 374 and is connected to inverter 398 which is connected by line 399 to the input "reset" terminal 400 of flip-flop 393. The output terminal 401 of flip-flop 393 (marked with a "1" to indicate a positive voltage output when a positive voltage is applied to the set input terminal 392) is connected by line 402 to an input terminal of NOR gate circuit 404. The other output terminal 405 of flip-flop 393 (marked with an "0" to indicate zero or false voltage output when a positive voltage input is applied to the set input terminal) is connected by line 406 to an input terminal of NOR gate circuit 397. The output terminal 405 is also connected by line 407 to an input terminal of NOR gate circuit 408.

The output terminal of NOR gate circuit 397 is connected by line 411 to the input "set" terminal 412 of flip-flop 413. Only output terminal 414 of flip-flop 413 is utilized, and that terminal is connected by line 415 to the input terminal of monostable, or one shot, circuit 416 (see FIGURE 19), by line 417 to an input terminal of NOR circuit 408, by line 418 to a plurality of AND circuits indicated as a group as 419, by line 420 and 422 to the input terminal of AND circuit 423, by line 424 to terminals of switches 158a and 158b, and by line 425 to an input terminal of NOR circuit 404. Monostable circuit 416 upon receiving a signal from output terminal 414, produces a single pulse of 150 milliseconds duration.

There are six AND circuits in group 419 which have output terminals connected to solenoids 316a, 316b, 316c, 316d, 316e, and 316f (FIGS. 15 and 19) which are the solenoids which actuate the valves controlling the position of the six selecter bars 311a, 311b, 311c, 311d, 311e, and 311f.

The output of NOR circuit 404 is connected by line 429 to the input terminal of monostable circut 430 which, when receiving a signal from NOR circuit 404, will produce a single pulse of 0.1 millisecond. The output terminal of circuit 430 is connected to an inverter-amplifier 431 which is connected by line 432 to the reset terminal 433 of a ten-stage binary counter circuit 434. Binary counter circuit 434 may be of any suitable type such as Model FF1513GH manufactured by Intellux Inc., Box 929, Santa Barbara, Calif. The output terminal of an oscillator 435 is connected to the input terminal of NOR circuit 408. The output terminal of NOR circuit 408 is connected by line 437 to the input terminal 436 of counter circuit 434.

Null clutch switch 158b is connected by line 450 to an amplifier 451 which is connected to the reverse clutch coil 104a of reverse motor 104. Switch 158b is also connected by line 452 to the input of an OR circuit 453. The output of OR circuit 453 is connected to inverter 454 which is connected to the input of AND circuit 423 by a line 456. Line 457 connects the output of AND circuit 423 to the input of OR circuit 458.

Null clutch switch 158a is connected by a line 459 to the input of OR circuit 453, and to the input of OR circuit 460. Output of OR circuit 460 is connected by line 461 to amplifier 462 which is connected to the clutch coil 102a of forward motor 102 (FIG. 3). Line 424 is connected to the reset terminal 463 of flip flop circuit 464 which has its output terminal 466 connected by a line 467 to the input of OR circuit 460.

As indicated in FIGURE 19, logic control circuit 376 receives power from a true voltage source 470 which source is connected to the input of an OR circuit 471 by closing a start switch 472 which initiates the automatic starting of the machine. The output of OR circuit 471 is connected to the input of flip-flop 464 by line 471a. Another power source 473 of true voltage is connected to the input of OR circuit 471 by line 474 and line 476 having a switch 477 (FIGS. 10 and 19) therein which is normally open and is momentarily closed upon return of the carriage 28 to its starting position in the scanning path. Switch 477 is momentarily closed by impact of the stop 251 against rubber pad 251a which pad deflects slightly upon impact and then returns to its original position as indicated in FIGURE 10.

A line 475 connects line 474 to the reset terminal of flip-flop 413 and also connects this terminal to a manual reset button 475a. Line 475 is also connected to an inverter 475b which is connected to OR circuit 458.

Line 415 (FIG. 19) is also connected to amplifier 481 by line 479 which amplifier is connected to the coil 159 of positioning null clutch 155 (FIGS. 7 and 8). Line 482, from the output of monostable circuit 416, is connected to the input 482 of flip-flop 484. The output of flip-flop 484 is connected by line 486 to amplifier 487 which is connected to the coil 231 of pneumatic valve 224 (FIG. 9) which directs air into cylinder 42 causing the carriage 28 to move transversely out of the scanning path.

Line 488 connects line 486 to the input of OR circuit 489. The output of OR circuit 489 is connected to the monostable circuit 490 which is connected to an amplifier 491 that is connected to the coil 223 of inlet pressure regulating blocking valve 221 (FIG. 9) which controls the pressure entering pneumatic power unit 42, and when energized shifts the air pressure from 80 p.s.i. to 40 p.s.i.

A true voltage source 492 (FIG. 19) is connected to line 493 having a switch 494 therein that is closed upon completion of the patching cycle. Line 493 is connected to the input of OR circuit 489 and the input 496 of flip-flop 497. The output of flip-flop 497 is connected by line 498 to amplifier 499 which is connected to the coil 230 (FIGS. 9 and 19) of pneumatic valve 224 which causes the carriage 28 to return to the scanning path. Line 502 connects line 476 to the reset terminal 503 of flip-flop 497.

A true voltage source 504 (FIG. 19) is connected by a line 506 having a switch 507 therein to the reset terminal 508 of flip-flop 484. Switch 507 (FIG. 10) is closed when the carriage 28 is moved transversely out of the scanning path and is stopped, in response to the prior detection of a defect in the sheet, by the stop 252 and shock absorber 254. Line 509 connects line 506 to monostable circuit 511 which is connected to a relay 512 which starts the cycle of operation of the patcher 30. The control circuit of the patcher 30 is as disclosed in the first aforementioned copending application and reference may be had to the application if a description of the circuit is desired.

As illustrated in FIG. 18, the six photoelectric cells 174 are connected to the input of OR circuit 516 which has its output connected by line 517 to amplifier 518 that is connected to lockout null clutch coil 173 of null clutch 168 (FIGS. 6 and 7), which shortly after being energized, mechanically effects the closing of normally open switch 172. Switch 172 is in line 519 which connects line 517 to inverter 520 which is connected to the input of NOR circuit 397. A true voltage source 521 is connected to line 517 by a switch 522 in line 523. Switch 522 is a normally closed switch which is held open when the carriage 28 is fully in the scanning path at the extreme lefthand end of its stroke (FIG. 10) and closes when the carriage moves out of the scanning path. Line 461, adjacent forward clutch 102a, is connected by line 524 to inverter 526 which is connected by line 527 to the input of NOR circuit 397.

The output of the aforementioned Schmitt trigger 395 is connected by line 528 to integrator 529 which has its output connected by line 531 to the input 532 of flip-flop 533. The output of flip-flop 533 is connected by line 534 to NOR circuit 397. The reset terminal of flip-flop 533 is connected by line 536 to line 399.

In operation of the veneer patching machine 18, scanner motor 364 (FIG. 16), which receives power from power source 364, is started by closing switch 364a. Forward motor 102 and reverse motor 104 (FIG. 3) are likewise started, and these three motors operate continuously during operation of the machine. An operator then removes a sheet 22 (FIG. 20) of veneer from supply pile 23 and places it on the support table 21 in the scanning path. As indicated in FIGURE 20 this sheet has two defects 22a' and 22a" therein. The operator moves the sheet into contact with the pair of forward clamping rollers 24 (FIG. 4).

In order to drive the forward pair of rollers 24 and rear pair of rollers 26 in direction C which will advance the sheet from one end of the machine to the other, the operator closes switch 472 (FIG. 19) to initiate the automatic operation of the machine. Prior to closing switch 472 all flip-flops are in reset state. Power then flows from power source 470, through switch 472, OR circuit 471, line 475, flip-flop 464, line 467, OR circuit 460, line 461, amplifier 462, and forward clutch coil 102a of forward motor unit 102 thereby driving both pairs of clamping rollers 24 and 26 (FIG. 4) which moves the sheet forward at about 3.3 feet per second in the direction of arrow C.

The leading edge of the sheet 22 then moves between the scanner lockout photoelectric cells 174 (FIG. 18) and the light source 361. When any one or all of the photoelectric cells 174 become covered by the veneer sheet, a true signal is sent to and through OR circuit 516, line 517, and amplifier 518 to the coil 173 of lockout null clutch 168 which is energized thereby driving cam 170 (FIG. 7). At this time a true signal is also transmitted from OR circuit 516, lines 517 and 519, and normally open switch 172 which remains open for about 3" of sheet travel due to the contour of the cam 170 which controls switch 172. Since switch 172 is open, a false signal is sent to inverter 520 which, in turn, sends a true signal or a positive voltage on NOR circuit 397. Any positive voltage on the inlet of NOR circuit 397 prevents a positive signal from passing therethrough, and accordingly, even though a defect might be detected in the sheet, prevents actuation of the null clutch coil 159 (FIG. 19) and brake coils 102b and 104a, as will be described hereinafter.

Since the photoelectric cells 174 are placed several inches upstream of the scanning plane and since the cam 170 (FIGS. 7 and 8) do not immediately close the switch 172, it will be apparent that defects in the first few inches of the sheet, for example 3", will prevent actuation of the patcher 30 during this time.

After the forward pair of clamping rollers 24 have moved the forward edge of the sheet about 3" past the scanning plane, the cam 170 closes switch 172 thus placing a positive or true voltage on inverter 520 which inverts this voltage and places it as a true signal in NOR circuit 397. Any defect on the sheet 22 that is detected by the scanner 25, except defects immediately adjacent the side or trailing edges of the sheet, will then stop the sheet and activate the patching cycle. If no defect is detected in a sweep of the scanner 30, the sheet will continue to move in the direction of arrow C (FIG. 20).

At the start of each scanning cycle, light 375 (FIGS. 16 and 18) will act through the rotating mirror 365 of scanner 30 to activate photomultiplier tube 372a which transmits a false signal through inverter 390, thereby changing the signal to a positive signal which flows through line 391 into the input terminal 392 of flip-flop 393. A true or positive signal will then be sent from flip-flop outlet terminal 401 through line 402 to NOR circuit 404 which terminates movement of the signal. A false signal will be sent from outlet terminal 405 of flip-flop 393 through line 406 to NOR circuit 397. This false signal will also be sent through line 407 to NOR circuit 408. If a defect is not detected by the scanner 25, light reflected off the sheet 22 will cause photomultiplier tube 372b to direct a false signal to inverter 394 which inverts the signal and passes it through Schmitt trigger 395 and line 396 to NOR circuit 397 as a positive voltage thereby rendering NOR circuit 397 inactive. This positive signal also passes into integrator 529 which delays the signal and sends it to the "set" terminal of flip-flop 533 after the reflected light beam has moved inwardly from the side of the sheet about 1⅜ inches. Output of flip-flop 533 then directs a false signal to NOR circuit 397 through line 534. Since the signal from line 396 into the input of NOR circuit 397 is positive, no signal will enter line 411 and flip-flop 431 will be in its "reset" condition from the previous cycle, thereby directing a negative signal through line 415, 417 into the input of NOR circuit 408. Since NOR circuit 408 has a negative signal from lines 417 and 407, and also receives alternate positive and negative signals from oscillator 435, binary counter 434 will be placed in operation and will make one count for each negative signal received from 983 kc. oscillator 435. Since at this time, each of the AND circuits 419 receives a false signal from line 418, the output of these AND circuits will be negative and none of the solenoids 316 will be activated.

If there is no defect in the scanning path, the light from lamp 374 will at the end of the scanning path be reflected into photomultiplier tube 372c by mirror 365 thereby energizing tube 372c which sends a false signal to inverter 398, which inverts the signal and resets flip-flop 533 thereby sending a positive signal through line 534 to NOR circuit 397. Flip-flop 393 is also reset from line 399 thereby sending a false signal to NOR circuit 404 through line 402. Since flip-flop 413 is still in the "reset" condition, a false signal is also sent from line terminal 414 and lines 415, 425 to the input of NOR circuit 404 thus energizing the same. Since NOR circuit 404 is energized, a positive signal will be sent to monostable circuit 430 which after of 0.1 millisecond delay stable circuit 430 which after 0.1 millisecond delay sends the positive signal through inverter-amplifier 431 which directs the amplified false signal to binary counter 434 and resets the same to zero. Thus, light reflected from the sheet into photomultiplier tube 372c terminates the scan path of one mirror, resets the binary counter 434, and prepares the circuit for the next scanning pass effected by the next mirror 365.

The scanning operations continue as above described until the continuously advanced sheet move the first defect 22a' (FIG. 21) into the scanning path. The scanning cycle is again started as above described by energization of photomultiplier tubes 372a and 372b thereby starting the binary counter 434 in the above-described manner. When the mirror 365 detects the defect 22a' it momentarily interrupts the beam of reflected light to tube 372b. The output of tube 372b thus becomes positive which is inverted by inverter 394. The false signal is then sharpened by the Schmitt trigger 395 and is directed to the input of NOR circuit 397. Since at this time, all five input signals to NOR circuit 397 are false, a positive signal will be directed through line 411 into the input of defect flip-flop 413. A true or positive output signal is sent from flip-flop 413 through lines 415 and 417 to NOR circuit 408 thus immediately stopping the signal to binary counter 434, and AND circuits 419 thereby causing only the particular AND circuit 419 which receive a positive signal from the amplifier 434a of counter 434 to send a positive signal to one of the solenoids, for example solenoid 316b (FIG. 15) thereby shifting selector bar 311b causing a selected one of the sixty-four stop blades 307 to move into the path of bumper 305 (FIG. 12).

A positive signal is also sent through lines 415 and 479 to amplifier 481 and positioning null clutch coil 159 thereby immediately energizing null clutch 155 (FIG. 6) which causes cam shaft 156 and cams 157a and 157b to rotate.

The brake coils 102a and 104a (FIG. 18) are energized by a positive signal from flip-flop 413, which signal passes through line 415, line 420, line 422, AND circuit 423, OR circuit 458, amplifier 440 to brake coils 102b and 104b. It will be noted that AND circuit receives a positive voltage from line 422 and also from line 450 at this time since neither switch 158a or 158b is closed and accordingly the false output of OR circuit 453 will be inverted by an inverter 454. Assuming that inertia acting on the system causes the defect in the sheet to move past the scanning plane, null clutch cam 107b will close switch 158b which will direct a positive signal from line 424, through closed switch 158b, line 450, amplifier 451 to reverse clutch 104a thereby energizing the same causing the clamping rollers 24 and 26 to move the sheet in a reverse direction. During this reverse movement brake coils 102b and 104b are de-energized by virtue of a positive signal from closed switch 158b, line 452, OR circuit 453 which direct a positive signal to inverter 454 which inverts the signal and thus directs a negative signal to AND circuit 423. This places output of AND circuit 423 at zero voltage and, accordingly, prevents transfer of power through OR circuit 421 thus de-energizing brake coils 102a and 104a. Ususally the first reversal of the drive for the pairs of clamping rollers 24 and 26 will cause the defect to null out on the scan line thus opening both switches 158a and 158b. However, if the inertia should cause the defect to overshoot the scan plane in a reverse direction, null cam 107a (FIG. 6) will close switch 158a directing a positive signal into OR circuit 453 thereby de-energizing the brake coils 102b and 104b as above described, and also directing a positive signal through line 459, OR circuit 460, line 461, amplifier 462 to forward clutch 102a which causes the sheet to move in the forward direction. The above braking or nulling operation is repeated, if necessary until the defect is accurately positioned on the scan line and both switches 158a and 158b are open. This longitudinal positioning operation for the particular detected defect is completed within 150 milliseconds and terminates with the brake coils 102b and 104b energized.

The system is then ready for transverse movement of the carriage 28 thus placing the defect in alignment with a longitudinal plane passing through the head of the patcher 30 as indicated in FIGURE 22, and such movement is initiated by a signal from monostable circuit 416 (FIG. 19) which is delayed 150 milliseconds from the moment null clutch coil 159 is energized. The positive output signal from monostable circuit 416 is directed through line 482 into flip-flop 484 which directs a positive signal through line 486, and amplifier 487 to forward traverse coil 231; and through line 488, OR circuit 489, monostable circuit 490, and amplifier 491 to high pressure coil 223. Energization of coil 231 (FIG. 9) causes 80 p.s.i. air to initiate rapid movement of the carriage 28 to the right (FIG. 9) and energization of value coil 223, which is delayed slightly by monostable circuit 490, shifts valve core 222 causing 40 p.s.i. air to propel carriage 28 through the remainder of the stroke.

After the carriage 28 (FIGS. 10 and 11) is gently brought to a stop by virtue of bumper 305 engaging the lowered stop blade 307, and shock absorber 254 assuming the fully retracted position illustrated in FIGURE 11 thereby accurately positioning the defect under the head of the patcher 30, switch 507 is closed. Closing of switch 507 directs a positive signal from source 504 (FIG. 19) through closed switch 507, line 506 and 509, monostable circuit 511 which delays the signal 0.1 second, to patcher 512 thereby initiating the patching cycle. The signal from line 506 also resets flip-flop 484 thereby de-energizing coils 231 and 223.

After the patcher cycle is completed, switch 494 is closed thereby directing a positive signal from source 492, closed switch 494, line 493, flip-flop 497, line 498 and amplifier 499 to return traverse coil 230. This signal is also sent through OR circuit 489, monostable circuit 490 and amplifier 491 to high pressure valve coil 223. Thus, the return stroke of the carriage is initiated, and like the forward stroke, begins under 80 p.s.i. pressure and terminates under 40 p.s.i. pressure. During the time the sheet 22 was out of the scanning path for patching, switch 522 (FIGS. 10 and 18) is closed thereby bypassing the photoelectric cells 174 and maintaining lockout clutch 173 engaged and switch 172 closed.

Upon return of the carriage 28 to its starting position within the scan path as indicated in FIGURE 23, switch 477 (FIGS. 10 and 19) is momentarily closed thus directing a signal from power source 473, through closed switch 477, and line 476 and 474 to OR circuit 471 thereby resuming forward movement of the sheet as already described. It will be noted that the momentary closing of switch 477 also sends a signal through line 475, inverter 475b to OR circuit 458 thereby de-energizing brake coils 102b and 104b. This signal also resets flip-flop 413 (FIG. 18) and flip-flop 497 thereby preparing control circuit 376 for continued scanning of the sheet.

The above-described operations are repeated for the second defect 22a'' as indicated in FIGURES 24, 25 and 26. After both defects 22a' and 22a'' have been removed and patched by patches 31a' and 31a'', scanning of the sheet continues until the trailing edge of the sheet 22 moves past all photoelectric cells 174 thereby de-energizing lockout null clutch coil 173. De-energization of coil 173 causes spring 176 (FIGS. 6 and 7) to return cam shaft 169 and cam 170 to their starting positions thereby opening normally open switch 172 and placing a false signal at the input of inverter 520 thereby placing a true signal NOR circuit 397 which prevents subsequent defects from triggering the patching cycle. Since the photoelectric cells 174 are placed about 3 inches upstream of the scanning plane, the trailing 3 inches of the sheet will not effect the conveying system or patching cycle because they are locked out by the NOR circuit 397.

Solenoids 335a and 335b (FIGS. 13 and 19), which control the raising and lowering of the tubes 331 to permit return of the stop blades 307 to their raised starting position after completion of each patching cycle, are energized, respectively, upon energization of reverse transverse valve coil 230 and upon momentary closing of switch 477 which acts through an amplifier 530.

It will be noted that raising of the blades 307 will occur immediately upon energization of coils 230 and 335a, and that shortly thereafter during the return stroke of the carriage 28 that the coils 223 and 335b will be energized thereby effecting the lowering of the tubes 331 to prepare the blades for the next cycle of operation.

From the foregoing description it is apparent that the apparatus of the present invention includes a conveying system that advances the sheets from one end of the machine to the other while scanning for defects in the sheet. Upon detection of a defect the drive of the conveying system, under control of a control system which accurately locates the defect both longitudinally and laterally of the machine, moves the defect into alignment with the patching head of the patcher.

The veneer patching machine also includes means responsive to the dimensions and position of the sheet being scanned to prevent detected defects adjacent both side and end edges of the sheet from initiating the patching cycle and for causing the conveyor to move the defect into patching position.

Although the best mode contemplated for carrying out the present invention has been herein shown and described, it will be apparent that modifications and variations may be made without departing from what is regarded to be the subject matter of the invention as set forth in the appended claims.

We claim:

1. In a machine for detecting and patching defects in a sheet having longitudinal and transverse edges, said machine having a light source for directing light against one side of the sheet, and having a scanner responsive to a lack of reflected light from the sheet to detect defects on the sheet as it moves along a longitudinal scanning path, the improvement which comprises sheet advancing means for moving the sheet along a scanning path, control means connected between said scanner and said sheet advancing means for activating said sheet advancing means when said light is reflected off said sheet and for deactivating said sheet advancing means for terminating forward movement of said sheet by said advancing means upon detection of a defect, and scanner lockout means associated with said scanner and said control means and responsive to the detection of an edge of the sheet moving along the scanning path for retaining said sheet advancing means activated upon the detection of a defect lying within less than about three inches from an edge of the sheet.

2. An apparatus according to claim 1 wherein said scanning path is wider than the sheet being scanned and wherein said scanner scans along a plane extending transversely of said path from one longitudinal edge to the other.

3. An apparatus according to claim 2 wherein said edge detecting means includes a pivotally supported guide shoe, means for resiliently urging said shoe against said other edge, and a light reflecting screen disposed parallel to and extending a distance less than about three inches over said other edge, said screen being positioned in the scanning path and in said scanning plane to reflect light therefrom as the scanner scans across said other edge thereby preventing the scanner from sensing any defects below said screen.

4. An apparatus according to claim 2 wherein said control means includes an electronic circuit which is activated in response to light reflected off the sheet and which includes an electronic time delay circuit that is activated upon sensing the first light reflected from said one longitudinal edge of the sheet into the sensor and which holds inactive that portion of said control means which deactivates the sheet advancing means upon detection of a defect for a time sufficient for the beam to move a predetermined distance less than about three inches inwardly of said one end of the sheet.

5. An apparatus according to claim 3 wherein said control means includes an electronic circuit which is activated in response to light reflected off the sheet and which includes an electronic time delay circuit that is activated upon sensing the first light reflected from said one longitudinal edge of the sheet into the sensor and which holds inactive that portion of said control means which deactivates the sheet advancing means upon detection of a defect for a time sufficient for the beam to move a predetermined distance less than about three inches inwardly of said one edge of the sheet, said beam thereafter being effective to activate said control means upon detection of a defect for terminating forward movement of said sheet by said advancing means until said reflected beam reaches said screen.

6. An apparatus according to claim 2 wherein an edge being detected is the leading transverse edge and wherein said lockout means includes a series of photoelectric cells disposed on the other side of the sheet from said light source and positioned upstream of said scanning plane a distance less than about three inches, transmission means connected to and driven by said sheet advancing means, a cam shaft, a cam on said cam shaft and having a cam lobe thereon extending a substantial distance around said cam, a switch disposed at a starting position adjacent said cam and arranged to be activated only by said lobe, said switch being spaced from said lobe when in the starting position, a normally open clutch disposed between said transmission and said cam shaft and being closed to connect said cam shaft in driving relation to said transmission when one or more of said photoelectric cells are activated by movement of the leading edge of the sheet between said light source and said one or more photocells, said switch being activated by said lobe only after the leading edge of said sheet has moved a distance less than about three inches downstream of said scanning plane, and means cononecting said switch to said control means whereby when said switch is deactivated said sheet advancing means remains activated upon the detection of a defect and when said switch is actuated by said lobe said advancing means is deactivated upon the detection of a defect.

7. An apparatus according to claim 6 wherein said cam lobe retains said switch closed until the trailing edge of the sheet moves past all of said photoelectric cells at which time said clutch is deactivated, and additionally comprising means for returning said cam shaft and cam to their starting positions thereby deactivating said switch to cause said sheet advancing means to remain activated upon the detection of a defect within less than about three inches from the trailing edge of the sheet.

8. An apparatus according to claim 5 wherein an edge being detected is the leading transverse edge and wherein said lockout means includes a series of photoelectric cells disposed on the other side of the sheet from said light source and positioned upstream of said scanning plane a distance less than about three inches, transmission means connected to and driven by said sheet advancing means, a cam shaft, a cam on said cam shaft and having a cam lobe thereon extending a substantial distance around said cam, a switch disposed at a starting position adjacent said cam and arranged to be activated only by said lobe, said switch being spaced from said lobe when in the starting position, a normally open clutch disposed between said transmission and said cam shaft and being closed to connect said cam shaft in driving relation to said transmission when one or more of said photoelectric cells are activated by movement of the leading edge of the sheet between said light source and said one or more photocells, said switch being activated by said lobe only after the leading edge of said sheet has moved a distance less than about three inches downstream of said scanning plane, and means connecting said switch to said control means whereby when said switch is deactivated said sheet advancing means remains activated upon the detection of a defect and when said switch is actuated by said lobe said advancing means is deactivated upon the detection of a defect.

9. An apparatus according to claim 8 wherein said cam lobe retains said switch closed until the trailing edge of the sheet moves past all of said photoelectric cells at which time said clutch is deactivated, and additionally comprising means for returning said cam shaft and cam to their starting positions thereby deactivating said switch to cause said sheet advancing means to remain activated upon the detection of a defect within less than about three inches from the trailing edge of the sheet.

10. An apparatus according to claim 6 and additionally comprising means supporting said sheet advancing means for moving said sheet advancing means transversely out of the scanning path, means responsive to the termination of movement of the sheet by said sheet advancing means in response to the detection of a defect for moving the sheet transversely out of the longitudinal scanning path, and means for maintaining said clutch closed during movement of the sheet out of said path.

11. An apparatus according to claim 9 and additionally comprising means supporting said sheet advancing means for moving said sheet advancing means transversely out of the scanning path, means responsive to the termination of movement of the sheet by said sheet advancing means in response to the detection of a defect for moving the sheet transversely out of the longitudinal scanning path, and means for maintaining said clutch closed during movement of the sheet out of said path.

References Cited
UNITED STATES PATENTS

| | | | |
|---|---|---|---|
| 3,165,961 | 1/1965 | Hammond | 83—371 |
| 3,191,857 | 6/1965 | Galey et al. | 83—371 |
| 3,205,740 | 9/1965 | Groves et al. | 83—371 |
| 3,264,916 | 8/1966 | Owen | 83—371 |

GERALD A. DOST, *Primary Examiner.*

U.S. Cl. X.R.

83—367; 144—3

UNITED STATES PATENT OFFICE
CERTIFICATE OF CORRECTION

Patent No. 3,446,255                                May 27, 1969

Arthur L. McGee et al.

It is certified that error appears in the above identified patent and that said Letters Patent are hereby corrected as shown below:

Column 4, line 43, "volt" should read -- bolt --. Column 6, line 26, "drivers" should read -- drives --. Column 9, line 55, "top" should read -- stop --. Column 11, line 4, "thtrough" should read -- through --; line 46, "read" should read -- rear --; line 66, "form" should read -- from --. Column 13, line 60, "circut" should read -- circuit --. Column 20, line 25, "cononecting" should read -- connecting --.

Signed and sealed this 17th day of November 1970.

(SEAL)

Attest:

Edward M. Fletcher, Jr.

Attesting Officer

WILLIAM E. SCHUYLER, JR.
Commissioner of Patents